United States Patent
Manning et al.

(10) Patent No.: US 10,127,289 B2
(45) Date of Patent: Nov. 13, 2018

(54) SYSTEMS AND METHODS FOR AUTOMATIC CLUSTERING AND CANONICAL DESIGNATION OF RELATED DATA IN VARIOUS DATA STRUCTURES

(71) Applicant: Palantir Technologies Inc., Palo Alto, CA (US)

(72) Inventors: Lawrence Manning, New York, NY (US); Rahul Mehta, New York, NY (US); Daniel Erenrich, Mountain View, CA (US); Guillem Palou Visa, London (GB); Roger Hu, New York, NY (US); Xavier Falco, London (GB); Rowan Gilmore, London (GB); Eli Bingham, New York, NY (US); Jason Prestinario, New York, NY (US); Yifei Huang, Jersey City, NJ (US); Daniel Fernandez, New York, NY (US); Jeremy Elser, New York, NY (US); Clayton Sader, San Francisco, CA (US); Rahul Agarwal, San Francisco, CA (US); Matthew Elkherj, Menlo Park, CA (US); Nicholas Latourette, San Francisco, CA (US); Aleksandr Zamoshchin, Aurora, CO (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/233,149

(22) Filed: Aug. 10, 2016

(65) Prior Publication Data
US 2017/0052958 A1 Feb. 23, 2017

Related U.S. Application Data

(60) Provisional application No. 62/207,335, filed on Aug. 19, 2015.

(51) Int. Cl.
*G06F 17/30* (2006.01)

(52) U.S. Cl.
CPC .... *G06F 17/3053* (2013.01); *G06F 17/30705* (2013.01); *G06F 17/30867* (2013.01)

(58) Field of Classification Search
None
See application file for complete search history.

(56) References Cited

U.S. PATENT DOCUMENTS

| 5,826,021 A | 10/1998 | Mastors et al. |
| 5,832,218 A | 11/1998 | Gibbs et al. |

(Continued)

FOREIGN PATENT DOCUMENTS

| AU | 2014203669 | 5/2016 |
| CN | 102054015 | 5/2014 |

(Continued)

OTHER PUBLICATIONS

"A Tour of Pinboard," http://pinboard.in/tour as printed May 15, 2014 in 6 pages.

(Continued)

*Primary Examiner* — Tyler Torgrimson
(74) *Attorney, Agent, or Firm* — Knobbe, Martens, Olson & Bear, LLP

(57) ABSTRACT

Computer implemented systems and methods are disclosed for automatically clustering and canonically identifying related data in various data structures. Data structures may include a plurality of records, wherein each record is associated with a respective entity. In accordance with some embodiments, the systems and methods further comprise identifying clusters of records associated with a respective entity by grouping the records into pairs, analyzing the respective pairs to determine a probability that both members of the pair relate to a common entity, and identifying a (Continued)

cluster of overlapping pairs to generate a collection of records relating to a common entity. Clusters may further be analyzed to determine canonical names or other properties for the respective entities by analyzing record fields and identifying similarities.

20 Claims, 8 Drawing Sheets

(56) References Cited

U.S. PATENT DOCUMENTS

| | | | |
|---|---|---|---|
| 5,878,434 | A | 3/1999 | Draper et al. |
| 5,897,636 | A | 4/1999 | Kaeser |
| 5,966,706 | A | 10/1999 | Biliris et al. |
| 5,978,475 | A | 11/1999 | Schneier et al. |
| 6,006,242 | A | 12/1999 | Poole et al. |
| 6,057,757 | A | 5/2000 | Arrowsmith et al. |
| 6,101,479 | A | 8/2000 | Shaw |
| 6,134,582 | A | 10/2000 | Kennedy |
| 6,243,717 | B1 | 6/2001 | Gordon et al. |
| 6,430,305 | B1 | 8/2002 | Decker |
| 6,463,404 | B1 | 10/2002 | Appleby |
| 6,519,627 | B1 | 2/2003 | Dan et al. |
| 6,523,019 | B1 | 2/2003 | Borthwick |
| 6,725,240 | B1 | 4/2004 | Asad et al. |
| 7,017,046 | B2 | 3/2006 | Doyle et al. |
| 7,058,648 | B1 | 6/2006 | Lightfoot et al. |
| 7,089,541 | B2 | 8/2006 | Ungar |
| 7,117,430 | B2 | 10/2006 | Maguire et al. |
| 7,403,942 | B1 | 7/2008 | Bayliss |
| 7,461,158 | B2 | 12/2008 | Rider et al. |
| 7,627,489 | B2 | 12/2009 | Schaeffer et al. |
| 7,739,246 | B2 | 6/2010 | Mooney et al. |
| 7,757,220 | B2 | 7/2010 | Griffith et al. |
| 7,770,032 | B2 | 8/2010 | Nesta et al. |
| 7,801,871 | B2 | 9/2010 | Gosnell |
| 7,877,421 | B2 | 1/2011 | Berger et al. |
| 7,912,842 | B1 | 3/2011 | Bayliss |
| 7,962,495 | B2 | 6/2011 | Jain et al. |
| 8,117,022 | B2 | 2/2012 | Linker |
| 8,126,848 | B2 | 2/2012 | Wagner |
| 8,190,893 | B2 | 5/2012 | Benson et al. |
| 8,290,838 | B1 | 10/2012 | Thakur et al. |
| 8,302,855 | B2 | 11/2012 | Ma et al. |
| 8,364,642 | B1 | 1/2013 | Garrod |
| 8,386,377 | B1 | 2/2013 | Xiong et al. |
| 8,392,556 | B2 | 3/2013 | Goulet et al. |
| 8,417,715 | B1 | 4/2013 | Bruckhaus et al. |
| 8,429,527 | B1 | 4/2013 | Arbogast |
| 8,554,719 | B2 | 10/2013 | McGrew |
| 8,601,326 | B1 | 12/2013 | Kirn |
| 8,639,552 | B1 | 1/2014 | Chen et al. |
| 8,688,573 | B1 | 4/2014 | Ruknoic et al. |
| 8,798,354 | B1 | 8/2014 | Bunzel et al. |
| 8,812,444 | B2 | 8/2014 | Garrod et al. |
| 8,838,538 | B1 | 9/2014 | Landau et al. |
| 8,855,999 | B1 | 10/2014 | Elliot |
| 8,903,717 | B2 | 12/2014 | Elliot |
| 8,924,388 | B2 | 12/2014 | Elliot et al. |
| 8,924,389 | B2 | 12/2014 | Elliot et al. |
| 8,938,434 | B2 | 1/2015 | Jain et al. |
| 8,938,686 | B1 | 1/2015 | Erenrich et al. |
| 9,105,000 | B1 | 8/2015 | White et al. |
| 9,230,060 | B2 | 1/2016 | Friedlander et al. |
| 9,286,373 | B2 | 3/2016 | Elliot et al. |
| 9,348,499 | B2 | 5/2016 | Aymeloglu et al. |
| 9,348,851 | B2 | 5/2016 | Kirn |
| 2002/0035590 | A1 | 3/2002 | Eibach et al. |
| 2002/0095360 | A1 | 7/2002 | Joao |
| 2002/0103705 | A1 | 8/2002 | Brady |
| 2002/0112157 | A1 | 8/2002 | Doyle et al. |
| 2002/0194058 | A1 | 12/2002 | Eldering |
| 2003/0061132 | A1 | 3/2003 | Mason et al. |
| 2003/0074187 | A1 | 4/2003 | Ait-Mokhtar et al. |
| 2003/0088438 | A1 | 5/2003 | Maughan et al. |
| 2003/0093401 | A1 | 5/2003 | Czahkowski et al. |
| 2003/0105759 | A1 | 6/2003 | Bess et al. |
| 2003/0115481 | A1 | 6/2003 | Baird et al. |
| 2003/0126102 | A1 | 7/2003 | Borthwick |
| 2003/0171942 | A1 | 9/2003 | Gaito |
| 2003/0177112 | A1 | 9/2003 | Gardner |
| 2003/0182313 | A1 | 9/2003 | Federwisch et al. |
| 2003/0212718 | A1 | 11/2003 | Tester |
| 2004/0003009 | A1 | 1/2004 | Wilmot |
| 2004/0006523 | A1 | 1/2004 | Coker |
| 2004/0034570 | A1 | 2/2004 | Davis |
| 2004/0083466 | A1 | 4/2004 | Dapp et al. |
| 2004/0088177 | A1 | 5/2004 | Travis et al. |
| 2004/0117387 | A1 | 6/2004 | Civetta et al. |
| 2004/0153451 | A1 | 8/2004 | Phillips et al. |
| 2004/0210763 | A1 | 10/2004 | Jonas |
| 2004/0236688 | A1 | 11/2004 | Bozeman |
| 2005/0010472 | A1 | 1/2005 | Quatse et al. |
| 2005/0097441 | A1 | 5/2005 | Herbach et al. |
| 2005/0102328 | A1 | 5/2005 | Ring et al. |
| 2005/0131935 | A1 | 6/2005 | O'Leary et al. |
| 2005/0262493 | A1 | 11/2005 | Schmidt et al. |
| 2005/0262512 | A1 | 11/2005 | Schmidt et al. |
| 2006/0010130 | A1 | 1/2006 | Leff et al. |
| 2006/0080283 | A1 | 4/2006 | Shipman |
| 2006/0080316 | A1 | 4/2006 | Gilmore et al. |
| 2006/0143075 | A1 | 6/2006 | Carr et al. |
| 2006/0161558 | A1 | 7/2006 | Tamma et al. |
| 2006/0178954 | A1 | 8/2006 | Thukral et al. |
| 2006/0209085 | A1 | 9/2006 | Wong et al. |
| 2006/0218206 | A1 | 9/2006 | Bourbonnais et al. |
| 2006/0218491 | A1 | 9/2006 | Grossman et al. |
| 2006/0253502 | A1 | 11/2006 | Raman et al. |
| 2007/0000999 | A1 | 1/2007 | Kubo et al. |
| 2007/0067285 | A1 | 3/2007 | Blume |
| 2007/0162454 | A1 | 7/2007 | D'Albora et al. |
| 2007/0178501 | A1 | 8/2007 | Rabinowitz et al. |
| 2007/0192122 | A1 | 8/2007 | Routson et al. |
| 2007/0233756 | A1 | 10/2007 | D'Souza et al. |
| 2007/0271317 | A1 | 11/2007 | Carmel |
| 2007/0284433 | A1 | 12/2007 | Domenica et al. |
| 2007/0295797 | A1 | 12/2007 | Herman et al. |
| 2007/0299697 | A1 | 12/2007 | Friedlander et al. |
| 2008/0005063 | A1 | 1/2008 | Seeds |
| 2008/0104407 | A1 | 5/2008 | Horne et al. |
| 2008/0126344 | A1 | 5/2008 | Hoffman et al. |
| 2008/0126951 | A1 | 5/2008 | Sood et al. |
| 2008/0140387 | A1 | 6/2008 | Linker |
| 2008/0168054 | A1* | 7/2008 | Lee ............. G06F 17/30707 |
| 2008/0195672 | A1 | 8/2008 | Hamel et al. |
| 2008/0201580 | A1 | 8/2008 | Savitzky et al. |
| 2008/0208735 | A1 | 8/2008 | Balet et al. |
| 2008/0228467 | A1 | 9/2008 | Womack et al. |
| 2008/0267386 | A1 | 10/2008 | Cooper |
| 2008/0270316 | A1 | 10/2008 | Guidotti et al. |
| 2008/0281580 | A1 | 11/2008 | Zabokritski |
| 2008/0301042 | A1 | 12/2008 | Patzer |
| 2008/0313132 | A1 | 12/2008 | Hao et al. |
| 2009/0055487 | A1 | 2/2009 | Moraes et al. |
| 2009/0094270 | A1 | 4/2009 | Alirez et al. |
| 2009/0106178 | A1 | 4/2009 | Chu |
| 2009/0106242 | A1 | 4/2009 | McGrew |
| 2009/0112745 | A1 | 4/2009 | Stefanescu |
| 2009/0157732 | A1 | 6/2009 | Hao et al. |
| 2009/0164387 | A1 | 6/2009 | Armstrong et al. |
| 2009/0187546 | A1 | 7/2009 | Whyte et al. |
| 2009/0216562 | A1 | 8/2009 | Faulkner et al. |
| 2009/0228365 | A1 | 9/2009 | Tomchek et al. |
| 2009/0228507 | A1 | 9/2009 | Jain et al. |
| 2009/0228701 | A1 | 9/2009 | Lin |
| 2009/0249244 | A1 | 10/2009 | Robinson et al. |
| 2009/0271343 | A1 | 10/2009 | Vaiciulis et al. |
| 2009/0299830 | A1 | 12/2009 | West et al. |
| 2009/0307049 | A1 | 12/2009 | Elliott et al. |
| 2009/0313311 | A1 | 12/2009 | Hoffmann et al. |
| 2009/0313463 | A1 | 12/2009 | Pang et al. |
| 2009/0319515 | A1 | 12/2009 | Minton et al. |
| 2010/0057622 | A1 | 3/2010 | Faith et al. |

(56) References Cited

U.S. PATENT DOCUMENTS

| | | |
|---|---|---|
| 2010/0070531 A1 | 3/2010 | Aymeloglu et al. |
| 2010/0070842 A1 | 3/2010 | Aymeloglu et al. |
| 2010/0076813 A1 | 3/2010 | Ghosh et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0125470 A1 | 5/2010 | Chisholm |
| 2010/0145909 A1 | 6/2010 | Ngo |
| 2010/0204983 A1 | 8/2010 | Chung et al. |
| 2010/0211550 A1 | 8/2010 | Daniello et al. |
| 2010/0306285 A1 | 12/2010 | Shah et al. |
| 2011/0004626 A1 | 1/2011 | Naeymi-Rad et al. |
| 2011/0060910 A1 | 3/2011 | Gormish et al. |
| 2011/0066497 A1 | 3/2011 | Gopinath et al. |
| 2011/0093327 A1 | 4/2011 | Fordyce et al. |
| 2011/0099133 A1 | 4/2011 | Chang et al. |
| 2011/0131547 A1 | 6/2011 | Elaasar |
| 2011/0173093 A1 | 7/2011 | Psota et al. |
| 2011/0208565 A1 | 8/2011 | Ross et al. |
| 2011/0208822 A1 | 8/2011 | Rathod |
| 2011/0225586 A1 | 9/2011 | Bentley et al. |
| 2011/0238408 A1* | 9/2011 | Larcheveque ...... G06F 17/2785 704/9 |
| 2011/0252282 A1 | 10/2011 | Meek et al. |
| 2011/0258216 A1 | 10/2011 | Supakkul et al. |
| 2012/0013684 A1 | 1/2012 | Robertson et al. |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0078595 A1 | 3/2012 | Balandin et al. |
| 2012/0084287 A1 | 4/2012 | Lakshminarayan et al. |
| 2012/0089606 A1 | 4/2012 | Eshwar et al. |
| 2012/0136804 A1 | 5/2012 | Lucia |
| 2012/0150860 A1* | 6/2012 | Bhamidipati ........ G06Q 30/02 707/740 |
| 2012/0191446 A1 | 7/2012 | Binsztok et al. |
| 2012/0215784 A1 | 8/2012 | King et al. |
| 2012/0290879 A1 | 11/2012 | Shibuya et al. |
| 2013/0006947 A1 | 1/2013 | Olumuyiwa et al. |
| 2013/0016106 A1* | 1/2013 | Yip ...................... G06T 11/206 345/440 |
| 2013/0091084 A1 | 4/2013 | Lee |
| 2013/0096968 A1 | 4/2013 | Van Pelt et al. |
| 2013/0097130 A1 | 4/2013 | Bingol et al. |
| 2013/0124193 A1 | 5/2013 | Holmberg |
| 2013/0132348 A1 | 5/2013 | Garrod |
| 2013/0151453 A1 | 6/2013 | Bhanot et al. |
| 2013/0166480 A1 | 6/2013 | Popescu et al. |
| 2013/0198565 A1 | 8/2013 | Mancoridis et al. |
| 2013/0226879 A1 | 8/2013 | Talukder et al. |
| 2013/0226944 A1 | 8/2013 | Baid et al. |
| 2013/0246316 A1 | 9/2013 | Zhao et al. |
| 2013/0263019 A1 | 10/2013 | Castellanos et al. |
| 2013/0325826 A1 | 12/2013 | Agarwal et al. |
| 2014/0006404 A1 | 1/2014 | McGrew et al. |
| 2014/0032556 A1* | 1/2014 | Bayliss ............. G06F 17/30303 707/737 |
| 2014/0089339 A1 | 3/2014 | Siddiqui et al. |
| 2014/0095363 A1 | 4/2014 | Caldwell |
| 2014/0108074 A1 | 4/2014 | Miller et al. |
| 2014/0222793 A1 | 8/2014 | Sadkin et al. |
| 2014/0279299 A1 | 9/2014 | Erenrich |
| 2014/0297640 A1* | 10/2014 | Duftler .................. G06F 9/46 707/737 |
| 2014/0358829 A1 | 12/2014 | Hurwitz |
| 2015/0012509 A1 | 1/2015 | Kirn |
| 2015/0046481 A1 | 2/2015 | Elliot |
| 2015/0100907 A1 | 4/2015 | Erenrich et al. |
| 2015/0106379 A1 | 4/2015 | Elliot et al. |
| 2015/0188715 A1 | 7/2015 | Castelluci et al. |

FOREIGN PATENT DOCUMENTS

| | | |
|---|---|---|
| DE | 102014204827 | 9/2014 |
| DE | 102014204830 | 9/2014 |
| DE | 102014204834 | 9/2014 |
| DE | 102014213036 | 1/2015 |
| EP | 1566758 | 8/2005 |
| EP | 1962222 | 8/2008 |
| EP | 2487610 | 8/2012 |
| EP | 2551799 | 1/2013 |
| EP | 2778913 | 9/2014 |
| EP | 2778914 | 9/2014 |
| EP | 2897051 | 7/2015 |
| EP | 3035214 | 6/2016 |
| EP | 3133511 | 1/2017 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2005/010685 | 2/2005 |
| WO | WO 2009/051987 | 4/2009 |
| WO | WO 2010/030919 | 3/2010 |
| WO | WO 2011/017289 | 5/2011 |
| WO | WO 2011/071833 | 6/2011 |
| WO | WO 2012/061162 | 5/2012 |
| WO | WO 2012/079836 | 6/2012 |
| WO | WO 2013/067077 | 5/2013 |

OTHER PUBLICATIONS

"E-MailRelay," http://web.archive.org/web/20080821175021/http://emailrelay.sourceforge.net/ Aug. 21, 2008, pp. 2.

Anonymous, "A Real-World Problem of Matching Records," Nov. 2006, http://grupoweb.upf.es/bd-web/slides/ullman.pdf pp. 1-16.

Brandel, Mary, "Data Loss Prevention Dos and Don'ts," http://web.archive.org/web/20080724024847/http://www.csoonline.com/article/221272/Dos_and_Don_ts_for_Data_Loss_Prevention, Oct. 10, 2007, pp. 5.

Chaudhuri et al., "An Overview of Business Intelligence Technology," Communications of the ACM, Aug. 2011, vol. 54, No. 8.

Delicious, http://delicious.com/ as printed May 15, 2014 in 1 page.

Ferreira et al., "A Scheme for Analyzing Electronic Payment Systems," Brasil 1998.

Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.

Gill et al., "Computerised Linking of Medical Records: Methodological Guidelines," Journal of Epidemiology and Community Health, 1993, vol. 47, pp. 316-319.

Gu et al., "Record Linkage: Current Practice and Future Directions," Jan. 15, 2004, pp. 32.

Hua et al., "A Multi-attribute Data Structure with Parallel Bloom Filters for Network Services", HiPC 2006, LNCS 4297, pp. 277-288, 2006.

Johnson, Maggie, "Introduction to YACC and Bison", CS143, Handout 13, Jul. 8, 2005, pp. 11.

Johnson, Steve, "Access 2013 on demand," Access 2013 on Demand, May 9, 2013, Que Publishing.

Lim et al., "Resolving Attribute Incompatibility in Database Integration: An Evidential Reasoning Approach," Department of Computer Science, University of Minnesota, 1994, http://reference.kfupm.edu.sa/content/r/e/resolving_attribute_incompatibility_in_d_531691. pdf pp. 1-10.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Nadeau et al., "A Survey of Named Entity Recognition and Classification," Jan. 15, 2004, pp. 20.

Nin et al., "On the Use of Semantic Blocking Techniques for Data Cleansing and Integration," 11th International Database Engineering and Applications Symposium, 2007, pp. 9.

(56) References Cited

OTHER PUBLICATIONS

Pythagoras Communications Ltd., "Microsoft CRM Duplicate Detection," Sep. 13, 2011, https://www.youtube.com/watch?v=j-7Qis0D0Kc.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Sekine et al., "Definition, Dictionaries and Tagger for Extended Named Entity Hierarchy," May 2004, pp. 1977-1980.

Wang et al., "Research on a Clustering Data De-Duplication Mechanism Based on Bloom Filter," IEEE 2010, 5 pages.

Wikipedia, "Multimap," Jan. 1, 2013, https://en.wikipedia.org/w/index.php?title=Multimap&oldid=530800748.

Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.

Notice of Acceptance for Australian Patent Application No. 2014203669 dated Jan. 21, 2016.

Notice of Allowance for U.S. Appl. No. 12/556,307 dated Mar. 21, 2016.

Notice of Allowance for U.S. Appl. No. 12/556,307 dated Jan. 4, 2016.

Notice of Allowance for U.S. Appl. No. 14/094,418 dated Jan. 25, 2016.

Notice of Allowance for U.S. Appl. No. 14/223,918 dated Jan. 6, 2016.

Notice of Allowance for U.S. Appl. No. 14/304,741 dated Apr. 7, 2015.

Notice of Allowance for U.S. Appl. No. 14/552,336 dated Nov. 3, 2015.

Official Communication for Australian Patent Application No. 2014201506 dated Feb. 27, 2015.

Official Communication for Australian Patent Application No. 2014201507 dated Feb. 27, 2015.

Official Communication for Australian Patent Application No. 2014203669 dated May 29, 2015.

Official Communication for European Patent Application No. 09813700.3 dated Apr. 3, 2014.

Official Communication for European Patent Application No. 10188239.7 dated Mar. 24, 2016.

Official Communication for European Patent Application No. 14158958.0 dated Mar. 11, 2016.

Official Communication for European Patent Application No. 14158958.0 dated Apr. 16, 2015.

Official Communication for European Patent Application No. 14158958.0 dated Jun. 3, 2014.

Official Communication for European Patent Application No. 14158977.0 dated Jun. 10, 2014.

Official Communication for European Patent Application No. 14158977.0 dated Mar. 11, 2016.

Official Communication for European Patent Application No. 14158977.0 dated Apr. 16, 2015.

Official Communication for European Patent Application No. 14199180.2 dated Jun. 22, 2015.

Official Communication for European Patent Application No. 14199180.2 dated Aug. 31, 2015.

Official Communication for European Patent Application No. 15200073.3 dated Mar. 30, 2016.

Official Communication for Great Britain Patent Application No. 1404486.1 dated May 21, 2015.

Official Communication for Great Britain Patent Application No. 1404486.1 dated Aug. 27, 2014.

Official Communication for Great Britain Patent Application No. 1404489.5 dated May 21, 2015.

Official Communication for Great Britain Patent Application No. 1404489.5 dated Aug. 27, 2014.

Official Communication for Great Britain Patent Application No. 1404499.4 dated Jun. 11, 2015.

Official Communication for Great Britain Patent Application No. 1404499.4 dated Aug. 20, 2014.

Official Communication for Great Britain Patent Application No. 1411984.6 dated Dec. 22, 2014.

Official Communication for Netherlands Patent Application No. 2012417 dated Sep. 18, 2015.

Official Communication for Netherlands Patent Application No. 2012421 dated Sep. 18, 2015.

Official Communication for Netherlands Patent Application No. 2012438 dated Sep. 21, 2015.

Official Communication for Netherlands Patent Application No. 2013134 dated Apr. 20, 2015.

Official Communication for New Zealand Patent Application No. 622389 dated Mar. 20, 2014.

Official Communication for New Zealand Patent Application No. 622404 dated Mar. 20, 2014.

Official Communication for New Zealand Patent Application No. 622439 dated Mar. 24, 2014.

Official Communication for New Zealand Patent Application No. 622439 dated Jun. 6, 2014.

Official Communication for New Zealand Patent Application No. 622473 dated Jun. 19, 2014.

Official Communication for New Zealand Patent Application No. 622473 dated Mar. 27, 2014.

Official Communication for New Zealand Patent Application No. 627061 dated Jul. 14, 2014.

Official Communication for New Zealand Patent Application No. 628161 dated Aug. 25, 2014.

Official Communication for U.S. Appl. No. 12/556,307 dated Oct. 1, 2013.

Official Communication for U.S. Appl. No. 12/556,307 dated Feb. 13, 2012.

Official Communication for U.S. Appl. No. 12/556,307 dated Mar. 14, 2014.

Official Communication for U.S. Appl. No. 12/556,307 dated Sep. 2, 2011.

Official Communication for U.S. Appl. No. 12/556,307 dated Jun. 9, 2015.

Official Communication for U.S. Appl. No. 13/827,491 dated Dec. 1, 2014.

Official Communication for U.S. Appl. No. 13/827,491 dated Jun. 22, 2015.

Official Communication for U.S. Appl. No. 13/827,491 dated Mar. 30, 2016.

Official Communication for U.S. Appl. No. 13/827,491 dated Oct. 9, 2015.

Official Communication for U.S. Appl. No. 14/014,313 dated Jun. 18, 2015.

Official Communication for U.S. Appl. No. 14/014,313 dated Feb. 26, 2016.

Official Communication for U.S. Appl. No. 14/304,741 date Mar. 3, 2015.

Official Communication for U.S. Appl. No. 14/304,741 dated Aug. 6, 2014.

Official Communication for U.S. Appl. No. 14/526,066 dated Jan. 21, 2016.

Official Communication for U.S. Appl. No. 14/526,066 dated May 6, 2016.

Official Communication for U.S. Appl. No. 14/552,336 dated Jul. 20, 2015.

Official Communication for U.S. Appl. No. 14/571,098 dated Nov. 10, 2015.

Official Communication for U.S. Appl. No. 14/571,098 dated Mar. 11, 2015.

Official Communication for U.S. Appl. No. 14/571,098 dated Feb. 23, 2016.

(56) References Cited

OTHER PUBLICATIONS

Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/975,215 dated May 19, 2016.
Bhattacharya et al., "Collective Entity Resolution in Relational Data," ACM Transactions on Knowledge Discovery from Data (TKDD," Association for Computing Machinery, Inc., vol. 1, No. 1, Mar. 1, 2007, pp. 5-es.
Draisbach et al., "A Comparison and Generalization of Blocking and Windowing Algorithm for Duplicate Detection," Aug. 24, 2009, retrieved from https://hpi.de/fileadmin/user_upload/fachgebiete/naumann/publication/2009/QDB09_crc.pdf.
Elmagarmid et al., "Duplicate Record Detection: A Survey," IEEE Transactions on Knowledge and Data Engineering, IEEE Service Center, Los Alamitos, California, US, vol. 19, No. 1, Jan. 1, 2007, pp. 1-16.
Getoor et al., "Entity Resolution for Big Data," Aug. 11, 2013, retrieved from http://www.umiacs.umd.edu/~geotoor/Tutorials/ER_KDD2013.pdf.
Kardes et al., "Graph-based Approaches for Organization Entity Resolution in MapReduce," Proceedings of the TextGraphs-8 Workshop, Oct. 18, 2013, pp. 70-78.
Kopcke et al., "Frameworks for Entity Matching: A Comparison," Data & Knowledge Engineering, vol. 69, No. 2, Feb. 1, 2010, pp. 197-210.
Ma et al., "A New Approach to Secure Logging," ACM Transactions on Storage, vol. 5, No. 1, Article 2, Published Mar. 2009, 21 pages.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
Waters et al., "Building an Encrypted and Searchable Audit Log," Published Jan. 9, 2004, 11 pages, http://www.parc.com/content/attachments/building_encrypted_searchable_5059_parc.pdf.
Wikipedia, "Record Linkage," May 9, 2015, retrieved from https://web.archive.org/web/20150509130215/http://en.wikipedia.org/wiki/Record_Linkage.
Official Communication for European Patent Application No. 16184820.5 dated Jan. 3, 2017.
Official Communication for U.S. Appl. No. 14/223,918 dated Jun. 8, 2015.
Official Communication for European Patent Application No. 16184820.5 dated Jan. 19, 2018.

\* cited by examiner

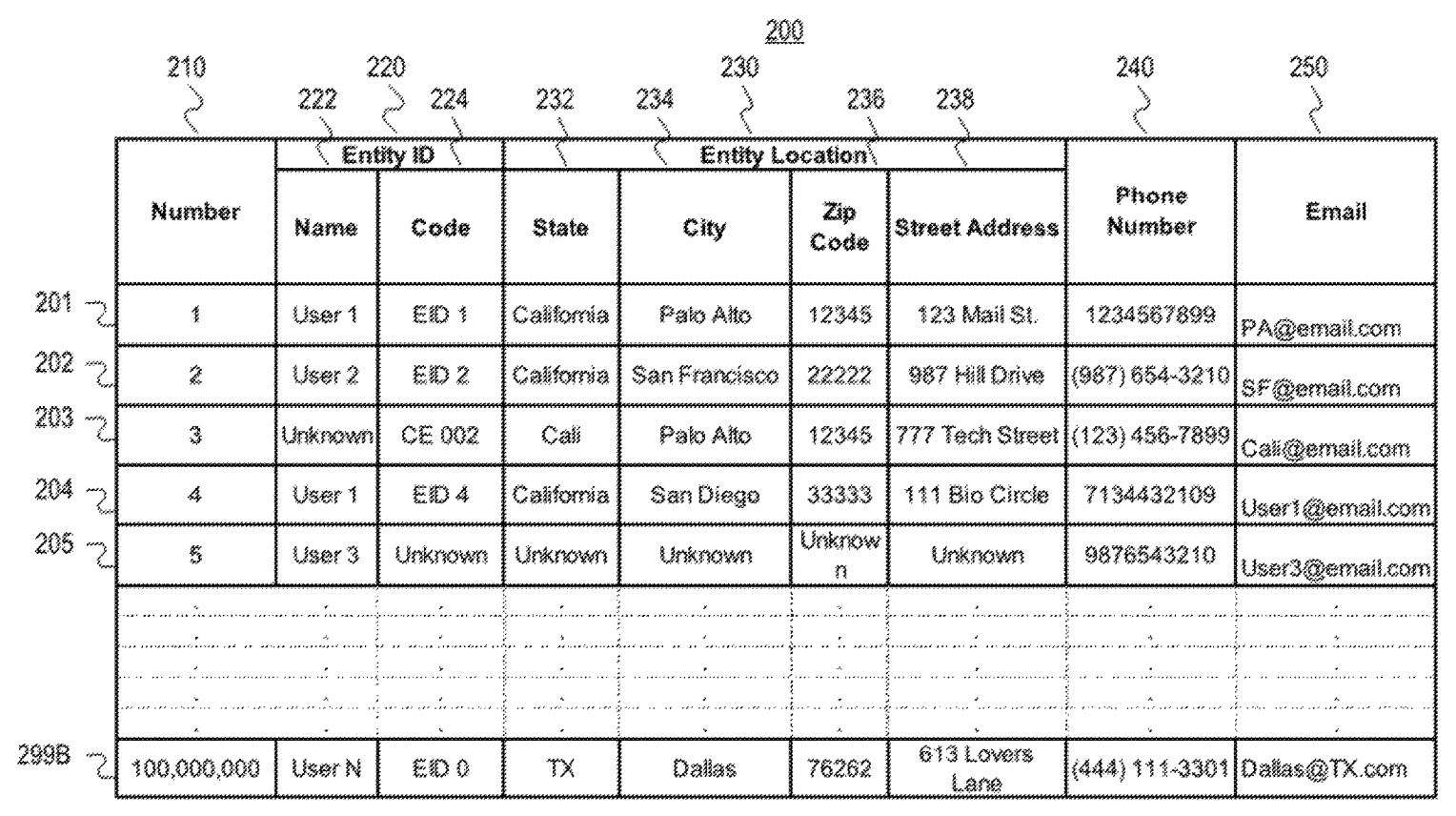

| Number | Entity ID | | Entity Location | | | | Phone Number | Email |
|---|---|---|---|---|---|---|---|---|
| | Name | Code | State | City | Zip Code | Street Address | | |
| 1 | User 1 | EID 1 | California | Palo Alto | 12345 | 123 Mail St. | 1234567899 | PA@email.com |
| 2 | User 2 | EID 2 | California | San Francisco | 22222 | 987 Hill Drive | (987) 654-3210 | SF@email.com |
| 3 | Unknown | CE 002 | Cali | Palo Alto | 12345 | 777 Tech Street | (123) 456-7899 | Cali@email.com |
| 4 | User 1 | EID 4 | California | San Diego | 33333 | 111 Bio Circle | 7134432109 | User1@email.com |
| 5 | User 3 | Unknown | Unknown | Unknown | Unknown | Unknown | 9876543210 | User3@email.com |
| ... | | | | | | | | |
| 100,000,000 | User N | EID 0 | TX | Dallas | 76262 | 613 Lovers Lane | (444) 111-3301 | Dallas@TX.com |

*Fig. 2*

| Number | Consuming Entity ID (e.g., name or code) | Consuming Entity Location | | | | Provisioning Entity ID (e.g., name or code) | Provisioning Entity Location | | | | Type of Provisioning Entity (e.g., name or code) | Interaction Amount (e.g., in Dollars) | Time of Interaction | |
|---|---|---|---|---|---|---|---|---|---|---|---|---|---|---|
| | | State | City | Zip Code | Street Address | | State | City | Zip Code | Street Address | | | Date | Time |
| 1 | User 1 | California | Palo Alto | 94304 | 123 Main St | PE001 | California | Palo Alto | 94304 | 234 University Ave | Gas Station | 74.56 | 2013/11/23 | 10:32 |
| 2 | CE002 | California | Sunnyvale | 94085 | 123 Murphy St | Merchant 2 | Unknown | Unknown | Unknown | Unknown | Supermarket | 23.56 | 2013/10/15 | 11:23 |
| 3 | User 1 | California | Palo Alto | 94304 | 123 Main St | Merchant 2 | Unknown | Unknown | Unknown | Unknown | TPE123 | 32.11 | 2013/10/21 | 19:50 |
| 4 | User 3 | California | San Francisco | 94102 | 1000 Lombard St | Merchant 3 | California | San Francisco | 94102 | 123 Market St | Coffee Shop | 8.97 | 2013/10/20 | 17:05 |
| 5 | User 3 | Unknown | Unknown | Unknown | Unknown | Merchant 3 | California | San Francisco | 94102 | 123 Market St | Coffee Shop | 5.34 | 2013/11/03 | 8:13 |
| ... | | | | | | | | | | | | | | |
| 80,000,000,000 | User N | California | Beverly Hills | 90210 | 123 Wilshire Blvd | Merchant N | California | Beverly Hills | 90210 | 789 Wilshire Blvd | TPE789 | 89.23 | 2013/10/29 | 14:00 |

*Fig. 3*

SYSTEMS AND METHODS FOR AUTOMATIC CLUSTERING AND CANONICAL DESIGNATION OF RELATED DATA IN VARIOUS DATA STRUCTURES

CROSS-REFERENCE TO RELATED APPLICATIONS

This application claims benefit of U.S. Provisional Patent Application No. 62/207,335, filed Aug. 19, 2015, and titled "SYSTEMS AND METHODS FOR AUTOMATIC CLUSTERING AND CANONICAL DESIGNATION OF RELATED DATA IN VARIOUS DATA STRUCTURES." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

BACKGROUND

Obtaining relevant information from multiple large lists of records can be relatively straightforward in some situations. One particular situation is when records in separate lists are similar and it is desired to obtain information in the records having a particular value or character string in a particular field. The fields at issue can be isolated using filtering functions of data interfacing software and the desired information retrieved. By using combinations of filtering functions, more sophistication can be provided to the way in which fields are identified for comparison. Once compared, some records can be isolated based on the comparisons on the particular fields. The isolated records can then be aggregated so as to provide a report including all the records that together constitute the desired information.

But in order to recognize common records, such filtering functions rely on identical fields across the records. In the real world, lists may have no identical fields across the records, despite those records being related, or can have identical fields in a relatively small number of fields (or parts of fields) such that existing filtering functions are unable to provide isolation of the desired records from other records. For example, such problems can occur when a list has records originating from a number of different sources. This problem only worsens as the size of lists becomes larger (e.g., a list having billions of records), in terms of the number of records present. With the sizes of lists in the real world increasing as time progresses, this problem is expected to worsen over time.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to an entity resolution system that may automatically analyze a data structure or structures containing large numbers of records, identify records that relate to a common entity, group these related records into clusters, and determine a canonical name for the entity to which the cluster of records relates. The automated analysis may include an automated application of various cleaning functions to enable efficient comparison of records, as well as various pairing functions to identify records for comparison. Embodiments of the present disclosure also relate to the automated scoring of record pairs to assess the likelihood of relating to a common entity, various clustering functions to group pairs of records into clusters, and various functions for determining a canonical name for the referenced entity based on the record contents.

As described below, records in a data structure (e.g., a list) may include one or more fields. A field may include any data, information, or things, such as a person, a place, a merchant, an account, a credit card, a transaction, a transaction amount, and/or the like. In an example application, a human analyst may be tasked with identifying suitable locations for automated teller machines based on the value of credit card transactions in the vicinity. However, the human analyst may be unable to timely correlate thousands or millions of transaction records to identify suitable locations without the computing technology and the embodiments of the present disclosure. Further, the implementation of the various embodiments of the present disclosure via computer technology enables many of the advantages described herein, including more efficient interaction with, and presentation of, various types of electronic data.

According to an embodiment, a system is disclosed comprising: a data store configured to store computer-executable instructions and a plurality of records, wherein each record of the plurality of records is associated with a respective entity and comprises one or more fields; a computing device including a processor in communication with the data store, the processor configured to execute the computer-executable instructions to at least: identify, based at least in part on a first field of the one or more fields, a first group of the plurality of records; divide the first group into one or more record pairs, each of the one or more record pairs comprising a respective first record and second record; determine, for each of the one or more record pairs, a respective match score, the respective match scores comprising probabilities that the respective first record and second record of the respective record pairs are associated with a respective same entity; identify a cluster of record pairs, wherein each pair in the cluster has a record in common with at least one other pair in the cluster, and wherein each pair in the cluster has a respective match score above a threshold; and output the cluster of record pairs to a client computing device.

According to an aspect, wherein the plurality of records comprises a plurality of credit card transaction records, and wherein the entity associated with each record of the plurality of records comprises a merchant.

According to another aspect, wherein the processor is further configured to execute the computer-executable instructions to at least: determine, based at least in part on a first pair in the cluster of pairs, a first candidate name to associate with the cluster; determine, based at least in part on a second pair in the cluster of pairs, a second candidate name based to associate with the cluster; and determine a name to associate with the cluster based at least in part on the first candidate name and the second candidate name.

According to yet another aspect, wherein determining the first candidate name is based at least in part on a first field of the first record and a corresponding second field of the second record.

According to another aspect, wherein determining the first candidate name comprises identifying a longest common substring of the first field and the second field.

According to yet another aspect, wherein determining the first candidate name is based at least in part on calculating a Levenshtein distance between a first field of the first record and a corresponding second field of the second record.

According to another aspect, wherein the processor is further configured to execute the computer-executable instructions to identify the first group of the plurality of records by at least: accessing a first record, a second record, and a third record of the plurality of records; accessing a blocking model including information indicative of at least a first field and a second field to be compared between candidate pairs of records; comparing a value of the first field of the first record with a value of the first field of the second record to determine first matching fields; comparing a value of the second field of the first record with a value of the second field of the second record to determine second matching fields; in response to determining the first matching fields and the second matching fields, grouping the first record and the second record into the first group; comparing the value of the first field of the second record with a value of the first field of the third record to determine third matching fields; comparing the value of the second field of the second record with a value of the second field of the third record to determine fourth matching fields; and in response to determining the third matching fields and the fourth matching fields, adding the third record to the first group.

According to yet another aspect, wherein determining at least one of the first, second, third, or fourth matching fields is based on a soft or fuzzy match.

According to another aspect, wherein determining at least one of the first, second, third, or fourth matching fields is based on a weighting.

According to yet another aspect, wherein the processor is further configured to execute the computer-executable instructions to identify the first group of the plurality of records by at least: accessing a first record, a second record, and a third record of the plurality of records; accessing a blocking model including information indicative of at least a first field to be compared between candidate pairs of records; comparing a value of the first field of the first record with a value of the first field of the second record to determine first matching fields; in response to determining the first matching fields, grouping the first record and the second record into the first group; comparing a value of the first field of the second record with a value of the first field of the third record to determine that the fields do not match; comparing the value of the first field of the second record with a value of the first field of the third record to determine second matching fields; in response to determining the second matching fields, adding the third record to the first group.

According to another aspect, wherein the processor is further configured to execute the computer-executable instructions to at least: validate first group of the plurality of record by at least one of: determining that a diameter of the first group satisfies a threshold, determining that a size of the first group satisfies a threshold, determining a distribution of sizes of groups including the first group satisfies a distribution rule, or determining an entropy of groups including the first group satisfies an entropy rule.

According to another embodiment, a method is disclosed comprising: obtaining a first plurality of records, wherein each record of the first plurality of records is associated with a respective entity and comprises a first one or more fields; obtaining a second plurality of records, wherein each record of the second plurality of records is associated with a respective entity and comprises a second one or more fields, and wherein no two records of the second plurality of records are associated with the same entity; identifying, based at least in part on a first field of the first one or more fields, a first subset of the first plurality of records; identifying, based at least in part on a second field of the second one or more fields, a second subset of the second plurality of records; generating a plurality of record pairs, wherein each record pair in the plurality of record pairs comprises a respective first record from the first subset and a respective second record from the second subset; determining a respective match score for each of the plurality of record pairs, the respective match scores comprising probabilities that the respective first record and second record of the respective record pairs are associated with a respective same entity; identifying, for each record in the first subset, a respective cluster of record pairs, wherein each record pair in the cluster includes the record; identifying, for each cluster of record pairs, a respective matching record pair based at least in part on the match scores of the record pairs in the cluster; and outputting the matching record pairs to a client computing device.

According to another aspect, wherein the first plurality of records comprises a plurality of credit card transaction records, wherein the second plurality of records comprises a plurality of geographic location records, and wherein the entities associated with the first and second pluralities comprise cities.

According to yet another aspect, wherein the second field corresponds to the first field.

According to another aspect, wherein identifying the respecting matching record pair for each cluster comprises identifying a record pair having a highest match score.

According to yet another aspect, wherein determining a match score is based at least in part on one or more reference pairs.

According to another aspect, wherein the one or more reference pairs each comprise a first matched record associated with a first entity and a second matched record associated with the first entity.

According to yet another aspect, wherein the one or more reference pairs each comprise a first unmatched record associated with a first entity and a second unmatched record associated with a second entity.

According to another aspect, the method further comprises: identifying an indeterminate record pair of the plurality of record pairs, the indeterminate record pair having a match score indicating a least certainty of whether the first record and second record of the indeterminate record pair are associated with the same entity; outputting the indeterminate record pair to a user; receiving, from the user, an indication that the first record and the second record of the indeterminate record pair are associated with the same entity; calculating, for each of the plurality of record pairs, a respective revised match score based at least in part on the indication; wherein identifying the respective matching record pair for each cluster of record pairs is further based at least in part on the revised match scores of the record pairs in the cluster.

According to yet another embodiment, a non-transitory computer-readable storage medium is disclosed including computer-executable instructions that, when executed by a processor, cause the processor to: obtain a plurality of records, wherein each record of the plurality of records is associated with a respective entity and comprises one or more fields; divide at least a portion of the plurality of records into one or more record pairs, each of the one or more record pairs comprising a respective first record and second record; determine, for each of the one or more record pairs, a respective match score, the respective match scores comprising probabilities that the respective first record and second record of the respective record pairs are associated with a respective same entity; and identify a first cluster of record pairs, wherein each pair in the first cluster has a record in common with at least one other pair in the first cluster, and wherein each pair in the first cluster has a respective match score above a first threshold.

According to another aspect, the computer-executable instructions that cause the processor to determine a respective match score for each of the one or more record pairs comprise computer-executable instructions that cause the processor to: obtain a plurality of reference pairs, each of the plurality of reference pairs comprising a respective first record and second record, wherein the respective first record and second record of a reference pair are associated with the same entity; determine a first plurality of match scores according to a first model, wherein the first plurality of match scores corresponds to the plurality of reference pairs; determine a second plurality of match scores according to a second model, wherein the second plurality of match scores corresponds to the plurality of reference pairs; determine, based at least in part on the first plurality of match scores, a first accuracy score for the first model; determine, based at least in part on the second plurality of match scores, a second accuracy score for the second model; wherein the computer-executable instructions that cause the processor to determine the respective match score for each of the plurality of record pairs cause the processor to determine the respective match score according to the model having the higher accuracy score.

According to yet another aspect, the computer-executable instructions further cause the processor to: output the first cluster of record pairs to a client computing device; receive, from the client computing device, a second threshold; identify a second cluster of record pairs, wherein each pair of the second cluster has a record in common with at least one other pair in the second cluster, and wherein each pair in the second cluster has a respective match score above the second threshold; and output the second cluster to the client computing device.

According to another aspect, the computer-executable instructions further cause the processor to obtain a model, and wherein the computer-executable instructions that cause the processor to determine the respective match score for each of the one or more record pairs cause the processor to determine the respective match score according to the model.

According to yet another aspect, the computer-executable instructions further cause the processor to generate one or more normalized fields for the plurality of records, and wherein the respective match score for each of the one or more record pairs is based at least in part on the one or more normalized fields.

According to another aspect, the computer-executable instructions further cause the processor to obtain a normalizing routine, and wherein the computer-executable instructions that cause the processor to generate one or more normalized fields for the plurality of records cause the processor to generate one or more normalized fields according to the normalizing routine.

According to another embodiment, a method is disclosed comprising: accessing a first record, a second record, and a third record, each record comprising a respective plurality of fields; accessing a blocking strategy including information indicative of at least a first field and a second field to be compared between candidate pairs of records; comparing a value of the first field of the first record with a value of the first field of the second record to determine first matching fields; comparing a value of the second field of the first record with a value of the second field of the second record to determine second matching fields; in response to determining the first matching fields and the second matching fields, grouping the first record and the second record into a first group; comparing the value of the first field of the second record with a value of the first field of the third record to determine third matching fields; comparing the value of the second field of the second record with a value of the second field of the third record to determine fourth matching fields; in response to determining the third matching fields and the fourth matching fields, adding the third record to the first group; analyzing each pair of records in the first group using a machine learning model to identify probabilities of matches for each pair of records; outputting pairs of records that have probabilities of matches satisfying a threshold.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Reference will now be made to the accompanying drawings, which illustrate example embodiments of the present disclosure and in which:

FIG. 2 is a block diagram of an example first list, consistent with embodiments of the present disclosure;

FIG. 3 is a block diagram of an example second list, consistent with embodiments of the present disclosure;

DETAILED DESCRIPTION

Reference will now be made in detail to example embodiments, the examples of which are illustrated in the accompanying drawings. Whenever possible, the same reference numbers will be used throughout the drawings to refer to the same or like parts.

Overview

Embodiments describe methods, systems, and non-transitory computer-readable mediums for associating related records to common entities across multiple lists. As stated previously, the one or more lists of data may be large, for example having billions of records. Some embodiments of the application can associate records that may not have useful identical fields while still excluding unrelated records, resulting in the association of records that relate to a common entity. Moreover, some embodiments of this application allow multiple lists of records that have no identical fields, but belong to the same common entity, to be associated to the common entity.

Further, some embodiments reduce the number of comparisons between multiple lists. With prior techniques, when a user desired to compare fields in multiple lists, every record in each list needed to be compared to every record in the every other list. With some embodiments of this application, merely relevant records in each list are compared together.

For example, assuming a first list comprises records that identify a plurality of entities by a distinct ID field and a second list identifies records from a plurality of sub-entities, each with a distinct ID, of the plurality of entities. In some embodiments, a system can associate all of the sub-entities of the second list with the entities of the first list.

Figure 1:
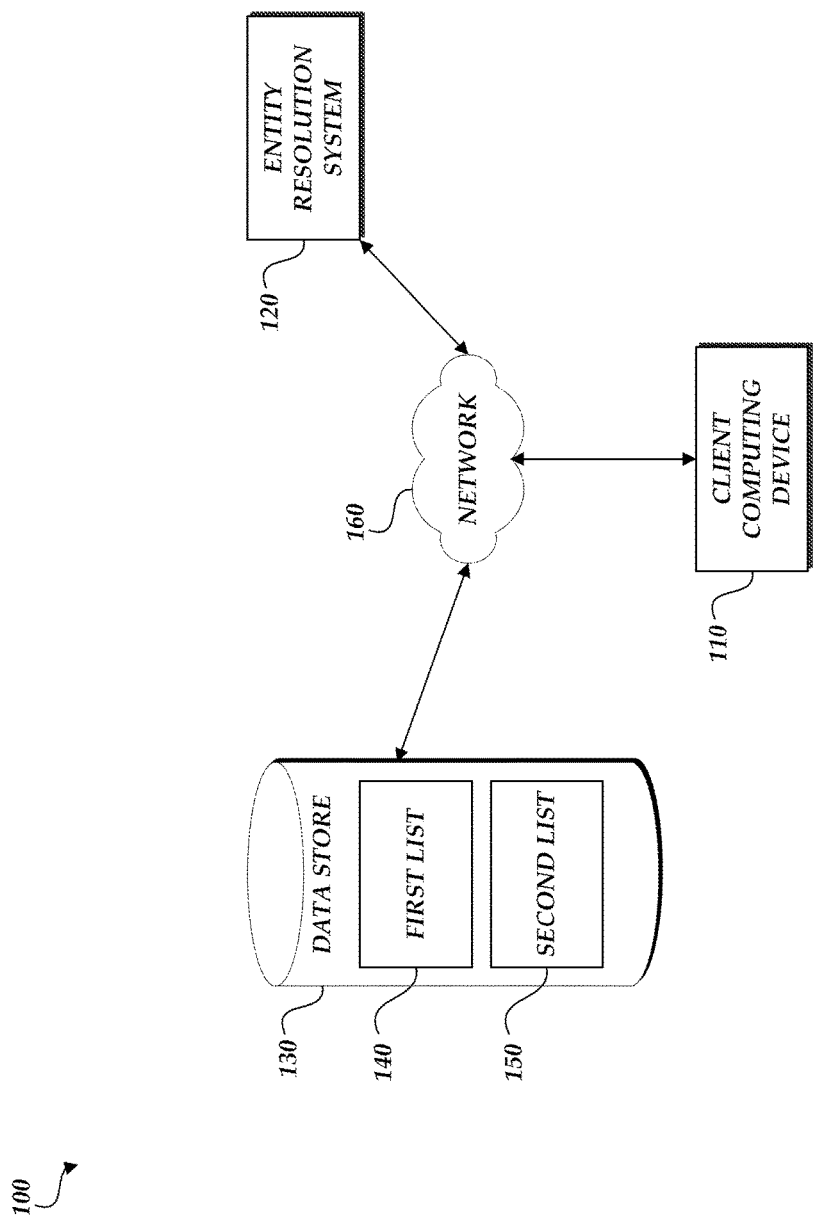
FIG. 1 is a block diagram of an example system for associating related records to common entities across multiple lists, consistent with embodiments of the present disclosure.

FIG. 1 is a block diagram of an example system 100 for associating related records to common entities across multiple lists, consistent with embodiments of the present disclosure. As shown, example system 100 includes a client computing device 110, an entity resolution system 120, and a data storage device 130, which may include a first list 140 and in some embodiments a second list 150. Further, client computing device 110, entity resolution system 120, and data storage device 130 can communicate over a network 160.

First list 140 and second list 150 can include data records, each having a number of fields. Examples of first list 140 and second list 150 are shown in FIGS. 2 and 3, respectively. Data storage device 130, however, does not need to include only first list 140 and second list 150. Data storage device 130 can include any numbers of lists, including only one list that would represent both first list 140 and second list 150. Also, example system 100 can include more than one data storage device 130. In the case of more than one data storage device 130, first list 140 and second list 150 can be in different data storage devices or can be in the same data storage device.

First list 140 and second list 150 can be any type of list, including a data structure, or part of a data structure, a database, or part of a database. Some examples of data structures are arrays, tuples, hash tables, sets, graphs, queues, stacks, etc. An example of a database is a Relational Database Management System (RDBMS) that stores the transaction data as rows in relational tables. Alternatively, first list 140 and second list 150 can be a column-oriented database management system that stores data as sections of columns of data rather than rows of data. This column-oriented DBMS can have advantages, for example, for data warehouses, customer relationship management systems, and library card catalogues, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of first list 140 and second list 150. First list 140 and second list 150 do not need to be the same type of list Client computing device 110 can include one or more software applications configured to present data and translate user inputs into requests for record association by entity resolution system 120. Client computing device 110 can also run on entity resolution system 120. In any event, a user would interact with example system 100 through client computing device 110. And while client computing device 110 is shown in FIG. 1, it is appreciated that multiple client computing devices can interact with data storage device 130 and entity resolution system 120.

Figure 4:
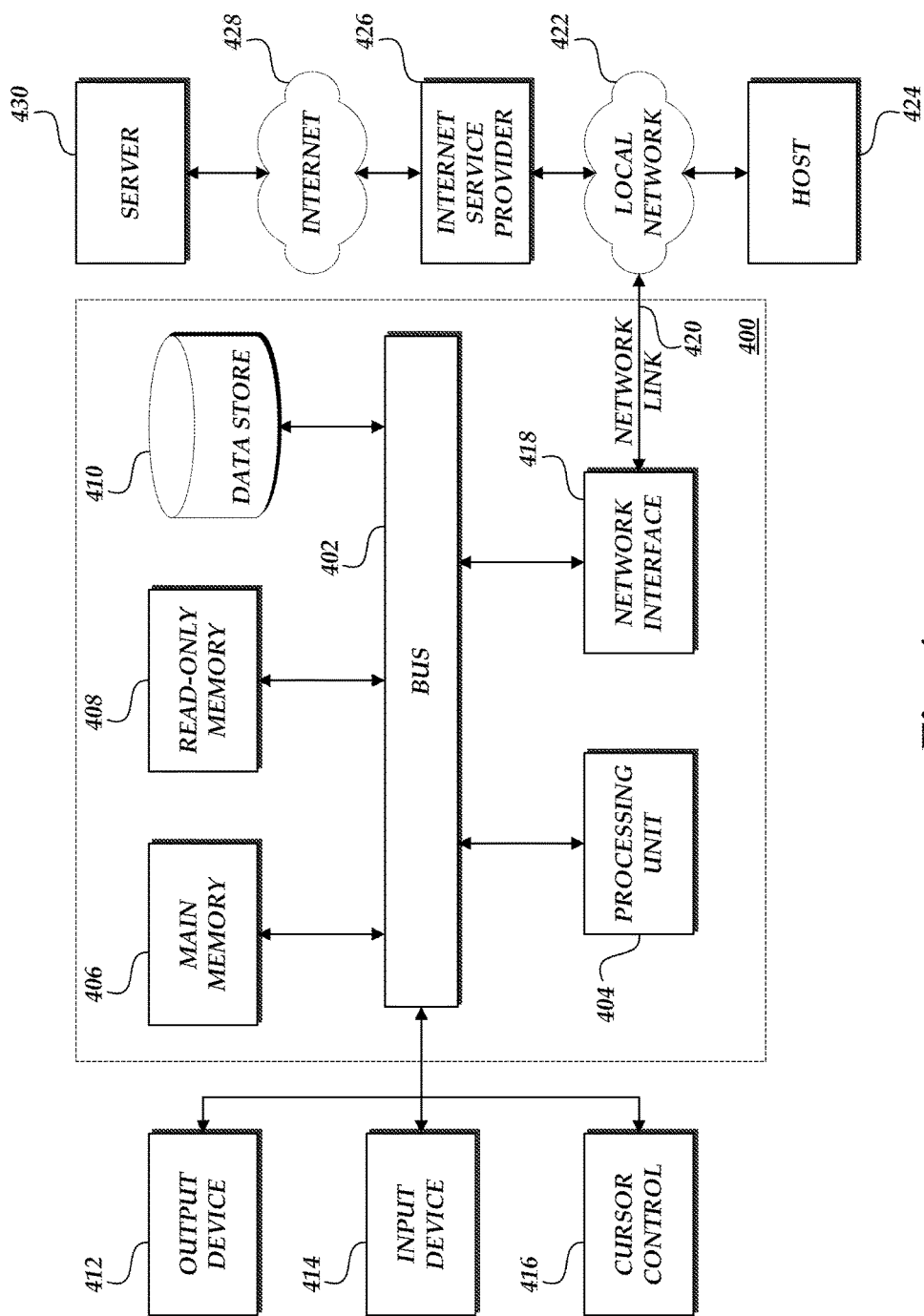
FIG. 4 is a block diagram of an example computer system, consistent with embodiments of the present disclosure.

Entity resolution system 120 can be a computing system configured to associate related records to common entities across multiple lists. For example, entity resolution system 120 can be a computer system configured to execute software or a set of programmable instructions that collect or receive records from different lists and process those records to associate related records to common entities that may not have useful identical fields while still excluding unrelated entity records, resulting in the identification of entity records that relate to a common entity. In some embodiments, entity resolution system 120 can be implemented using a computer system 400, as shown in FIG. 4 and described below.

Entity resolution system 120 can include one or more computing devices (e.g., server(s)), memory storing data and/or software instructions (e.g., database(s), memory device(s), etc.), and other known computing components. According to some embodiments, entity resolution system 120 can include one or more networked computers that execute processing in parallel or use a distributed computing architecture. Entity resolution system 120 can be configured to communicate with one or more components of system 100, and it can be configured to provide entity resolution information via an interface(s) accessible by users over a network (e.g., the Internet). For example, entity resolution system 120 can include a web server that hosts a web page accessible through network 160. In some embodiments, entity resolution system 120 can include an application server configured to provide data to one or more client applications executing on computing systems connected to entity resolution system 120 via network 160.

Entity resolution system 120 can read data from multiple lists (e.g., first list 140 and second list 150) from one or more data storage devices (e.g., data storage device 130). Entity resolution system 120 can store resolution data on at least one of client computing device 110, entity resolution system 120, data storage device 130, first list 140, and second list 150.

Entity resolution system 120 can use the resolution data to associate records retrieved from first list 140 and second list 150. Entity resolution system 120 can also pair the records from first list 140 and second list 150. Entity resolution system 120 can use the pairs to provide insights about a particular entity. Entity resolution system 120 can, in some embodiments, use the pairs to identify clusters of records that reference a common particular entity. In other embodiments, entity resolution system 120 can use the pairs to identify a canonical entity for records that refer to the same entity in different ways. For example, records may refer to a particular geographic location entity as "New York City," "NYC," "Manhattan," and "Soho." By identifying pairs of records that reference the entity, entity resolution system 120 can determine a canonical name for the location and associate all of the records in the cluster with the canonical name.

FIG. 2 is a block diagram of an example first list 140, consistent with embodiments of the present disclosure. First list 140 can store records associated with entities. As shown in FIG. 2, first list 140 can include a very large number of records.

For example, first list 140 includes 100 billion records. While each record of first list 140 is depicted as a separate row 201-205 and 299B in FIG. 2, it will be understood that each such record can be represented in other ways, for example, by a column or any other technique in the art. Also, first list 140 can include duplicate entities or duplicate sub-entities, as shown in rows 201 and 204. Each record can include several categories of information. For example, first list 140 includes: number category 210; entity identification category 220; entity location category 230; phone number category 240; and email category 250. It will be understood that FIG. 2 is merely example and that first list 140 can include more or less categories of information associated with a record.

Number category 210 can uniquely identify each record of first list 140. For example, first list 140 depicts 100 billion records as illustrated by number category 210 of the last row 299B of first list 140 as 100,000,000,000. It will be understood that this disclosure is not limited to any number of records and further that this disclosure can extend to a list with more or less than 100 billion records. It is also appreciated that number category 210 need not exist in first list 140.

Entity identification category 220 can identify an entity. In some embodiments, entity identification category 220 can represent the entity identification by providing at least one of: a name of the entity (e.g., name sub-category 222; User 1 for record 201; unknown for record 203); a code uniquely identifying the entity (e.g., code sub-category 224; EID1 for record 201; unknown for record 205). For example, the identifiers under entity identification category 220 can be a credit card number that can identify a person or a family, a social security number that can identify a person, a phone number or a MAC address associated with a cell phone of a user or family, or any other identifier.

Entity location category 230 can represent location information of the entity. In some embodiments, entity location category 230 can represent the location information by providing at least one of: a state of residence of the entity (e.g., state sub-category 232; California for record 201; unknown for record 205); a city of residence of the entity (e.g., city sub-category 234; Palo Alto for record 201; unknown for record 205); a zip code of residence of the entity (e.g., zip code sub-category 236; 12345 for record 201; unknown for record 205); and a street address of residence of the entity (e.g., street address sub-category 238; 123 Main Street for record 201; unknown for record 205).

Phone number category 240 can identify an entity's phone number. The phone number can be a character sequence. The character sequence can comprise of numbers, letters, spaces, or symbols, which can include "(," ")," ".," and "-." For example, phone number category 240 of record 201 is 1234567899, while phone number category 240 of record 302 is (987) 654-3210. Also, the phone number can be unknown. The phone number provides a way for the entity to be contacted over a phone. It would be recognized by a person of ordinary skill in the art that a phone number is not only for connecting over a phone.

Email category 250 can identify an entity's email address. The email address should include a sequence of numbers and letters followed by an "@" symbol. After the "@" symbol will be another sequence of numbers and letters followed by a period and another sequence of numbers and letters. For example, email category 250 of record 201 is sf@email.com. The email address can be unknown. The email address provides a way for the entity to be contacted over the internet. It would be recognized by a person of ordinary skill in the art that an email address is not only for connecting over the internet.

FIG. 3 is a block diagram of an example second list 150, consistent with embodiments of the present disclosure. Second list 150 can store data records associated with records involving multiple entities. As shown in FIG. 3, second list 150 can include data associated with a very large number of records associated with multiple entities. For example, second list 150 can include 50 billion records. While each record of second list 150 is depicted as a separate row in FIG. 3, it will be understood that each such record can be represented in other ways, for example, by a column or any other technique in the art. Each record can include several categories of information. For example, the several categories can include, number category 310; consuming entity identification category 320; consuming entity location category 330; provisioning entity identification category 340; provisioning entity location category 350; type of provisioning entity category 360; record amount category 370; and time of record category 380. It will be understood that FIG. 3 is merely example and that second list 150 can include more or less categories of information associated with a record.

Number category 310 can uniquely identify each record of second list 150. For example, second list 150 depicts 50 billion record as illustrated by number category 310 of the last row of second list 150 as 50,000,000,000. In FIG. 3, each row depicting a record can be identified by an element number. For example, record number 1 can be identified by element 301; record number 2 can be identified by element 302; and so on such that record 50,000,000,000 can be identified by 399B. It will be understood that this disclosure is not limited to any number of records and further that this disclosure can extend to lists with more or less than 50 billion records. It is also appreciated that number category 310 need not exist in second list 150.

Consuming entity identification category 320 can identify a consuming entity. In some embodiments, consuming entity identification category 320 can represent a name (e.g., User 1 for record 301; User N for record 399B) of the consuming entity. Alternatively, consuming entity identification category 320 can represent a code uniquely identifying the consuming entity (e.g., CE002 for record 302). For example, the identifiers under the consuming entity identification category 320 can be a credit card number that can identify a person or a family, a social security number that can identify a person, a phone number or a MAC address associated with a cell phone of a user or family, or any other identifier.

Consuming entity location category 330 can represent location information of the consuming entity. In some embodiments, consuming entity location category 330 can represent the location information by providing at least one of: a state of residence (e.g., state sub-category 332; California for element 301; unknown for record 305) of the consuming entity; a city of residence (e.g., city sub-category 334; Palo Alto for record 301; unknown for record 305) of the consuming entity; a zip code of residence (e.g., zip code sub-category 336; 94304 for record 301; unknown for record 305) of the consuming entity; and a street address of residence (e.g., street address sub-category 338; 123 Main St. for record 301; unknown for record 305) of the consuming entity.

Provisioning entity identification category 340 can identify a provisioning entity (e.g., a merchant or a coffee shop). In some embodiments, provisioning entity identification category 340 can represent a name of the provisioning entity (e.g., Merchant 2 for record 302). Alternatively, provisioning entity identification category 340 can represent a code uniquely identifying the provisioning entity (e.g., PE001 for record 301). Provisioning entity location category 350 can represent location information of the provisioning entity. In some embodiments, provisioning entity location category 350 can represent the location information by providing at least one of: a state where the provisioning entity is located (e.g., state sub-category 352; California for record 301; unknown for record 302); a city where the provisioning entity is located (e.g., city sub-category 354; Palo Alto for record 301; unknown for record 302); a zip code where the provisioning entity is located (e.g., zip code sub-category 356; 94304 for record 301; unknown for record 302); and a street address where the provisioning entity is located (e.g., street address sub-category 358; 234 University Ave. for record 301; unknown for record 302).

Type of provisioning entity category 360 can identify a type of the provisioning entity involved in each record. In some embodiments, type of provisioning entity category 360 of the provisioning entity can be identified by a category name customarily used in the industry (e.g., Gas Station for record 301) or by an identification code that can identify a type of the provisioning entity (e.g., TPE123 for record 303). Alternatively, type of the provisioning entity category 360 can include a merchant category code ("MCC") used by credit card companies to identify any business that accepts one of their credit cards as a form of payment. For example, MCC can be a four-digit number assigned to a business by credit card companies (e.g., American Express™, MasterCard™, VISA™) when the business first starts accepting one of their credit cards as a form of payment.

In some embodiments, type of provisioning entity category 360 can further include a sub-category (not shown in FIG. 3), for example, type of provisioning entity sub-category 361 that can further identify a particular sub-category of provisioning entity. For example, a record can comprise a type of provisioning entity category 360 as a hotel and type of provisioning entity sub-category 361 as either a bed and breakfast hotel or a transit hotel. It will be understood that the above-described examples for type of provisioning entity category 360 and type of provisioning entity sub-category 361 are non-limiting and that second list 150 can include other kinds of such categories and sub-categories associated with an record.

Record amount category 370 can represent a transaction amount (e.g., $74.56 for record 301) involved in each record. Time of record category 380 can represent a time at which the record was executed. In some embodiments, time of record category 380 can be represented by a date (e.g., date sub-category 382; Nov. 23, 2013, for record 301) and time of the day (e.g., time sub-category 384; 10:32 AM local time for record 301). Time sub-category 384 can be represented in either military time or some other format. Alternatively, time sub-category 384 can be represented with a local time zone of either provisioning entity location category 350 or consuming entity location category 330.

In some embodiments, each record data can include categories of information not shown in FIG. 3, including for example consuming entity loyalty membership category, consuming entity credit card type category, consuming entity age category, consuming entity gender category, consuming entity income category, consuming entity with children category, product information category, and service information category.

Consuming entity loyalty membership category can represent whether the consuming entity is part of a loyalty membership program associated with a provisioning entity. For example, consuming entity loyalty membership category can represent that the consuming entity is a member of one of Costco™ membership programs including Goldstar Member™, Executive Member™, and Business Member™. Consuming entity credit card type category can represent the type of credit card used by the consuming entity for a particular record. For example, consuming entity credit card type category can represent that the credit card used by the consuming entity for that particular record can be one either American Express™, MasterCard™, VISA™, or Discover™ credit cards. In some embodiments, consuming entity credit card type category can represent a kind of MasterCard™ (e.g., Gold MasterCard™ or Platinum MasterCard™) used for a particular record.

In some embodiments, consuming entity demographic information can be stored in each record. For example, consuming entity demographic information can include at least one of: consuming entity age category, consuming entity gender category, consuming entity income category, and consuming entity with children category. In some embodiments, consuming entity age category can represent age information associated with the consuming entity; consuming entity gender category can represent gender information (e.g., Male or Female) associated with the consuming entity; consuming entity income category can represent income information (e.g., greater than $100,000 per year) associated with the consuming entity; and consuming entity with children category can represent whether the consuming entity has any children under 18 or not. For example, if the consuming entity has children under 18, a positive indication can be stored and if the consuming entity does not have children under 18, a negative indication can be stored. In some embodiments, consuming entity with children category can store information representing a number of children associated with the consuming entity.

Product information category can represent information associated with a product that is involved in an record. For example, product information category can represent that the product involved in the record is a particular type of product based on a stock keeping unit ("SKU") of the product. In some embodiments, the product's SKU can be unique to a particular provisioning entity involved in that particular record. Alternatively, product information category can represent the product involved in the record with a at least one of a Universal Product Code, International Article Number, Global Trade Item Number, and Australian Product Number. Service information category can represent information associated with a service that is involved in a record. For example, service information category can represent that the service involved in the record is a particular type of service based on an SKU of the service. It will be appreciated that an SKU can uniquely represent either a product or a service. Some examples of services can be warranties, delivery fees, installation fees, and licenses.

In some embodiments, first list 140 may be a canonical list of entities, such as a list of city names and related information (e.g., geographic boundaries, postal codes, etc.), and entity resolution service 120 may associate each record of the second list 150 with a canonical city name from the first list 140, as described in more detail below. In other embodiments, entity resolution service 120 may be utilized to resolve entities for a single list. For example, the entity resolution service 120 may analyze a first list 140 to identify clusters of transaction records that were generated by a common merchant entity. One skilled in the art will appreciate that the aforementioned examples are illustrative and not limiting.

Example Computing Systems

FIG. 4 is a block diagram of an example computer system 400, consistent with embodiments of the present disclosure. Components of system 100, such as entity resolution system 120, and client computing device 110, can include the architecture based on or similar to that of computer system 400.

As illustrated in FIG. 4, computer system 400 can include a bus 402 or other communication mechanism for communicating information, and one or more hardware processors 404 (denoted as processor 404 for purposes of simplicity) coupled with bus 402 for processing information. Hardware processor 404 can be, for example, one or more general-purpose microprocessors or it can be a reduced instruction set of one or more microprocessors.

Computer system 400 also includes a main memory 406, such as a random access memory (RAM) or other dynamic storage device, coupled to bus 402 for storing information and instructions to be executed by processor 404. Main memory 406 (e.g., computer readable storage medium) also can be used for storing temporary variables or other intermediate information during execution of instructions to be executed by processor 404. Such instructions, after being stored in non-transitory storage media accessible to processor 404, render computer system 400 into a special-purpose machine that is customized to perform the operations specified in the instructions.

Computer system 400 further includes a read only memory (ROM) 408 or other static storage device (e.g., a computer readable storage medium) coupled to bus 402 for storing static information and instructions for processor 404. A storage device 410, such as a magnetic disk, optical disk, or USB thumb drive (Flash drive), other computer readable storage medium, etc. is provided and coupled to bus 402 for storing information and instructions.

Computer system 400 can be coupled via bus 402 to an output device 412, such as a cathode ray tube (CRT), liquid crystal display, or touch screen, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on output device 412. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 400 can include a user interface module to implement various graphical user interfaces (as described herein) that can be stored in a mass storage device (e.g., a computer readable storage medium) as executable software codes (e.g., computer readable program instructions) that are executed by the one or more computing devices.

Computer system 400 can implement the techniques described herein using customized hard-wired logic, one or more ASICs or FPGAs, firmware and/or program logic which in combination with the computer system causes or programs computer system 400 to be a special-purpose machine. According to some embodiments, the operations, functionalities, and techniques and other features described herein are performed by computer system 400 in response to processor 404 executing one or more sequences of one or more instructions (e.g., computer readable program instructions) contained in main memory 406. Such instructions can be read into main memory 406 from another storage medium, such as storage device 410. Execution of the sequences of instructions contained in main memory 406 causes processor 404 to perform the process steps described herein. In alternative embodiments, hard-wired circuitry can be used in place of or in combination with software instructions.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Computer system 400 can also include a network interface 418 coupled to bus 402. Network interface 418 can provide a two-way data communication coupling to a network link 420 that can be connected to a local network 422. For example, network interface 418 can be an integrated services digital network (ISDN) card, cable modem, satellite modem, or a modem to provide a data communication connection to a corresponding type of telephone line. As another example, network interface 418 can be a local area network (LAN) card to provide a data communication connection to a compatible LAN. Wireless links can also be implemented. In any such implementation, network interface 418 can send and receives electrical, electromagnetic, or optical signals that carry digital data streams representing various types of information.

Network link 420 can typically provide data communication through one or more networks to other data devices. For example, network link 420 can provide a connection through local network 422 to a host computer 424 or to data equipment operated by an Internet Service Provider (ISP) 426. ISP 426 in turn can provide data communication services through the world wide packet data communication network now commonly referred to as the "Internet" 428. Local network 422 and Internet 428 can both use electrical, electromagnetic or optical signals that carry digital data streams. The signals through the various networks and the signals on network link 420 and through network interface 418, which carry the digital data to and from computer system 400, can be example forms of transmission media.

Computer system 400 can send messages and receive data, including computer readable program instructions (e.g., program code), through the network(s), network link 420 and network interface 418. In the Internet example, a server 430 can transmit a requested code for an application program through Internet 428, ISP 426, local network 422 and network interface 418. The received code can be executed by processor 404 as it is received, and/or stored in storage device 410, or other non-volatile storage for later execution. In some embodiments, server 430 can provide information for being displayed on a display.

Example Methods of Entity Resolution

Figure 5:
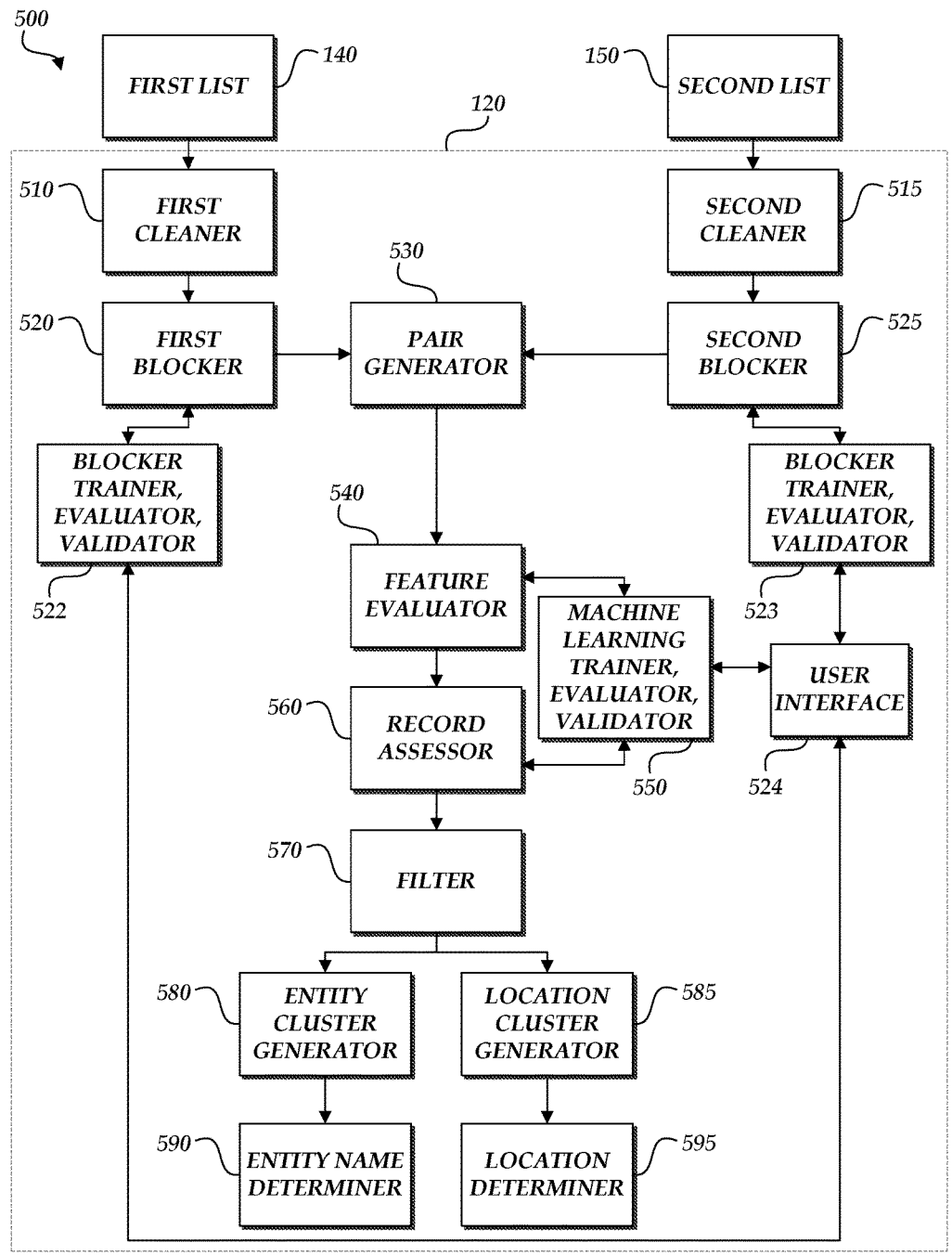
FIG. 5 is a block diagram representing an example process for generating clusters of records associated to common entities across multiple lists, consistent with embodiments of the present disclosure.

FIG. 5 shows a block diagram 500 representing an example process for associating related records to common entities across multiple lists, consistent with embodiments of the present disclosure. The dotted region, labeled 120, represents an example entity resolution system (e.g., entity resolution system 120 in FIG. 1). The example process can acquire two lists on the order of millions of records (e.g., first list 140 and second list 150) and determine whether records in each list are related.

The process can be used for at least one of data enrichment, data integration, or data deduplication. Data enrichment refers to processes used to enhance, refine, or otherwise improve raw data. Data integration involves combining data residing in different sources and providing users with a unified view of these data. Data deduplication refers to determining whether a particular list has duplicate entries. While FIG. 5 provides an example process flow for some embodiments of the present disclosure, it should be recognized by a person of skill in the art that not all steps need to be taken and that there can be additional steps.

A. Examples of Cleaners and Blockers

As shown in FIG. 5, entity resolution system 120 can receive first list 140 and second list 150, which were described above in reference to FIGS. 1-3. Entity resolution system 120 can then process first list 140 using a first cleaner 510 and a first blocker 520.

First cleaner 510 can apply one or more cleaning functions to first list 140. Example cleaning functions can include making alphanumeric characters in each field lowercase, taking out punctuation from a field, taking out all numbers in a field, taking out everything but the numbers in the field, or switching "St" for "Street" or vice versa. Cleaning functions can be applied to the data in one or more fields in each record of first list 140. The cleaning functions can be used to normalize all of the records so that other functions can be more easily applied to first list 140. One or more cleaning functions can be chosen or determined automatically, by a user, or a combination thereof.

To illustrate the application of a particular cleaning function, a field can comprise a phone number of (987) 654-3210. A cleaning function can be applied to the field that would only keep the numbers, resulting in the field comprising 9876543210. Thus, when this field is compared with another field that has a similar cleaning function applied to it, there will only be numbers to compare. Another cleaning function that can be applied would be to add a number in front of the phone number. An example would be adding the number 1. The result of this cleaning function would be the field comprising 19876543210.

As shown above, after a cleaning function is applied, the data in the record of first list 140 can be altered by the cleaning function. In some embodiments, the data in the record of first list 140 will not be altered directly; but instead, either indicate that such cleaning function should be applied to the particular one or more fields in the future or associate the cleaned field with the original field in the first list 140. In some embodiments, the data in the record of first list 140 will not be altered at all; but instead, a new list will be created that includes the records with the cleaned fields.

After first list 140 has been cleaned in first cleaner 510, the cleaned records of first list 140 are provided to first blocker 520. First blocker 520 can reduce the number of comparisons necessary to determine if two records are related to a similar entity by reducing the number of relevant records. First blocker 520 assigns one or more records of first list 140 to one or more groups (also referred to herein as subgroups) based on one or more fields. For example, an assignment can be based on phone number. In this example, if the phone number of a record in first list 140 matches the phone number of another record in first list 140, the two records would be assigned to the same group. Further, a record may not have a match; and thus would be assigned to a group comprising of itself.

Additionally, as mentioned, in some implementations records may be grouped based on matches between two or more fields. An example of an assignment to a group based on more than one field would be as follows. The assignment can be based on both the phone number and address. In this example, a record would only be put into a group with another record if both records have the same phone number and address.

In some embodiments, assignments can be based on a portion of a field. For example, an assignment to a group can be based on the first three numbers of a phone number. Thus, every record with the same first three numbers would be assigned to a particular group. In some embodiments, assignments can be based on fuzzy matching between one or more fields.

The group having the assigned records can be defined by a new list having those assigned records or by a number of pointers or other associations linking those assigned records to the group.

Entity resolution system 120 can also process second list 150 using a second cleaner 515 and a second blocker 525, which can provide similar functionality as those described above for first cleaner 510 and first blocker 520. While second cleaner 515 and second blocker 525 can provide similar functionality (e.g., cleaning and blocking), the application of that functionality may be different and may depend on how the data is stored in the fields of second list 150. For example, the field comprising (987) 654-3210 in first list 140 may be represented as 19876543210 in second list 150. For purposes of matching the data in the fields, it may be appropriate to clean or format the data so that the formatting of the data is consistent across both lists. If the desired end result is to compare a string of ten numbers, the field comprising (987) 654-3210 would need to have a cleaning function that removes everything but the numbers and the field comprising 19876543210 would need a cleaning function that removes the 1 from the front of the number.

Moreover, while FIG. 5 depicts two cleaners and two blockers, it is appreciated that only one cleaner and blocker may be used, wherein the cleaner and blocker each provide different instances based on whether the received input is the acquired first list 140 or the acquired second list 150. It is also appreciated that entity resolution system 120 does not include one or more cleaners as the formatting of data between first list 140 and second list 150 are consistent. Moreover, it is appreciated that cleaning can take place after blocking or pair generation.

As mentioned above, in some implementations, the blockers may apply techniques more advanced than just generating candidate pairs of records based on hard matches on a single field/key. Such advanced blocking techniques may generate larger groups of related records. These groups may then be evaluated individually by analyzing each pair of records within the group. Such groups may be generated based on a variety of advanced blocking techniques, which in some implementations may be combined.

In one set of example advanced blocking techniques, records may be grouped based on various combinations of fields/keys. In these examples, multiple cleaners or blockers may be used on the same list, and may be applied sequentially with each blocker taking as input the list generated from the previous blocker's output. For example, a first blocker may be used to assign records to groups based on telephone number area codes, and then a second blocker may be used to assign or re-assign records having toll-free numbers to various groups based on other information in the records. The application of multiple blockers may result in the generation of additional groups, as though they were together a single blocker. For example, groups generated by a first blocker may be joined with groups generated by a second blocker. In addition, or alternatively, a transitive OR'ing (e.g., a transitive logical OR) or a union of the two sets of groups (generated by the two blockers) may generate additional groups. Thus, for example, if a first blocker generates groups (A,B), (C,D), & (E), and a second blocker generates groups (A,B,C), (D), & (E), the system may additionally determine a transitive OR'ing between the sets of groups, or the union of the two sets of groups. For example, the system may combine the sets of groups to generate additional groups (A,B,C,D) & (E). Alternatively, or in addition, in some implementations, the system may further combine the two sets of groups to generate additional groups (A,D) & (B,D), as these groups include records that are grouped in the transitive OR'ing (or, in some cases, the union) of the original two sets of groups.

In some implementations, the application of multiple blockers and/or the configuration of a blocker to match on multiple fields may be easily defined by a user in the form of a Boolean expression. For example, the user may define grouping for a given blocker is to be based on matching between field A and field B, or alternatively matching between field B or field C. This example preference may be provided by the use in a Boolean expression in format similar to the following: (A and B) OR (B and C). The user may further indicate whether fields are to be hard matched or soft matched (e.g., particular field or fizzy matching), in any combination. Further, in some implementations weighting may be applied to combinations of hard and/or soft matched fields such that, for example, if the overall match satisfies a threshold probability (when the weightings applied to the individual fields is taken into account) of a match, the two records are considered a group. For example, if all the fields match, but the matches are soft (e.g., only partial matches or weak fuzzy matches), the blocker may determine that a threshold is not met, and thus the records are not a group. In another example, one or two out of three fields may match, but those one or two fields may be more heavily weighted that the third that does not match. Thus, the blocker may determine that the records are a group if the heavier weighting satisfies the threshold, even though the third field does not match.

In another set of example advanced blocking techniques, records may be grouped based on multi-step paths through fields/keys and records. In other words, in some implementations, a blocker may group records that are not directly related to one another. For example, as described above, a blocker may group record A and record B, and record B and record C, based on matches, partial matches, fuzzy matches, and/or the like, between fields of records of the respective groups. However, in some implementations, the blocker may further group records A, B, and C together based on the connection between the original groups provided by record B. Similarly, in some implementations, the blocker may group records based on links between groups of various distance. For example, a 2, 3, 4, or more-layer link between records may be used to group records. In some implementations, the types of fields through which paths may be evaluated are defined, and may be user defined as described above.

B. Examples of Blocker Evaluation, Validation, and Improvement

In various scenarios, simple and advanced techniques applied by the blockers may group records where the relationship among the records is weak, and/or may not group records that should be grouped. Thus, in some embodiments, as illustrated by blocks 522 and 523 of FIG. 5, the system includes methods for training, evaluating, and validating blockers. Efficiently accomplishing this is difficult because of the magnitude of the combinations of keys/fields and paths by which records may be grouped. For convenience, the techniques applied by blockers of the present disclosure may be referred to herein as "blocking techniques" or "blocking models".

In order to avoid blocking models that group records where the relationship among the records is weak (e.g., a false positive), and/or not group records that should be grouped (e.g., a false negative), blocking models may be evaluated, validated, and improved in a number of ways. Examples of methods for evaluating, validating, and improving blocking models that may be implemented by the system are described below.

In a first example, groups of records generated by using a blocking model may be considered mathematical graphs composed of vertices (e.g., records) and edges (e.g., matches between records), and may be analyzed based on one or more graph metrics. For example, a group may be analyzed to determine its size (e.g., the number of records in the group), diameter (e.g., the maximum distance between any two records in the group), or any other graph metric. In some implementations, when a blocking model generates a group that exceeds or does not satisfy a threshold for a graph metric, this may indicate that the blocking model is not effective. For example, when a blocking model generates a group of records having a large diameter (e.g., a diameter that exceeds a particular threshold), this may be an indication that at least some records within the group are not closely related to other records within the group. Thus, the system may validate the effectiveness of blocking models, determine that the blocking model needs to be improved or discarded, and the like. In various implementations, blocking models may be analyzed based on single groups and/or multiple groups. For example, a mean or median of a given metrics for multiple groups generated by a blocking model may be used to validate or evaluate the blocking model. In some implementations, a graph metric may be used as a filter (either as part of a blocking model or separate from a blocking model) such that, for example, groups that satisfy or do not satisfy a graph metric are eliminated.

In a second example, the distribution of groups of records generated by using one or more blocking models may be analyzed. For example, groups may be analyzed to determine types of groups that are frequently generated. In some implementations, when a blocking model generates groups with too high a frequency, or too low a frequency, or the distribution of groups created is unusual in some way, this may indicate that the blocking model is not effective. For example, when a blocking model frequently generates groups that have a particular matching field, this may be an indicator that the particular matching field is too common to be useful as a blocker. In some implementations, a frequency may be used as a filter (either as part of a blocking model or separate from a blocking model) such that, for example, groups that are created with over a threshold frequency are eliminated. In another example, particular blocking models, or particular fields for blocking, may be eliminated or disallowed.

In a third example, the entropy of groups of records generated by using one or more blocking models may be analyzed. For example, groups may be analyzed to determine the regularity of sizes of groups generated. In general, groups of roughly equal size indicate high entropy, and may indicate an effective blocking model, while groups of irregular size indicate low entropy, and may indicate an ineffective blocking model. In some implementations, entropy may be used as a filter (either as part of a blocking model or separate from a blocking model) such that, for example, a blocking model that generates groups with over or under a threshold entropy are eliminated or disallowed.

As described herein, the system may include user interfaces (e.g., user interface 524, which may be displayed to a user via client computing device 110) by which records may be reviewed and/or groups, models, etc. may be reviewed, trained, evaluated, and/or validated. In some implementations, the system may present groups generated by a blocking model in a user interface for review by a user so that the user may correct groups (e.g., remove or add records), or improve a blocking model in some way (e.g., change the fields that are matched, etc.). For example, a user may be able to use such a user interface to evaluate the size of a group, the distribution of groups, the frequency of groups generated based on given blocking models, the entropy of groups, and/or the like. The user may then, for example, select to discontinue use of a blocking model, modify/train a blocking model, and/or the like.

C. Examples of Blocker Training and Improving

In order to avoid blocking models that group records where the relationship among the records is weak (e.g., a false positive), and/or not group records that should be grouped (e.g., a false negative), blocking models may be trained and improved in a number of ways. Examples of methods for training and improving blocking models that may be implemented by the system are described below. In general, blocking model training and improvement may include initial training and ongoing feedback, or machine learning, to improve the blocking models.

In some implementations, initial training of a blocking model may start with a very permissive blocking model to generate bad groups of records (e.g., groups in which the records are not related to one another). These bad groups may be automatically or manually (e.g., via one or more user interfaces as described herein, such as user interface 524, which may be displayed to a user via client computing device 110) identified, which information may be used to improve the blocking model in an iterative fashion. For example, the bad groups may be fed back into the blocking model using any known machine learning technique to improve the model. In one example, multiple bad groups may be analyzed to determine fields that are not useful for matching (e.g., a "zip code" field may not be useful for matching (at least on its own) because similar zip codes are too common among records), and the blocking model may be updated to not make matches based on those determined fields.

Similarly, in some implementations, blocking models may be improved on an ongoing basis, for example in an iterative fashion. A user (e.g., via a user interface, e.g., user interface 524) or the system itself may feedback information (e.g., bad groups and good groups) to a blocking model to improve the blocking model using a machine learning method. For example, bad groups may be evaluated using any of the methods described above, and information from those evaluations/validations may be fed back into the blocking models. Additionally, user input may be fed back into the model. For example, a user may identify good groups, e.g., groups made up of records that are matched based on one or more fields that are sufficiently rare that the groups are very well matched. This information may then be fed back into the blocking model to improve it.

As mentioned above, the system may include user interfaces (e.g., user interface 524, which may be displayed to a user via client computing device 110) by which records may be reviewed and/or groups, models, etc. may be reviewed, trained, evaluated, and/or validated. In some implementations, the system may present groups generated by a blocking model in a user interface for review by a user so that the user may provide feedback to improve the blocking models and further train the blocking models, etc.

In various implementations, blocking models may be validated, trained, and improved at the blocking model level (e.g., "last name" blocking) or at any other level, such as the specific field value level (e.g., "last name=smith" blocking).

In an embodiment, active learning techniques similar to those described below may similarly be used for blocking model training, evaluating, validating, and improving.

D. Example Pair Generation

After one or more records from first list 140 and second list 150 have respectively been assigned to one or more groups, entity resolution system 120 uses a pair generator 530 to process at least one group from first list 140 and at least one group from second list 150. Pair generator 530 can associate a record of the one or more groups from first list 140 with a record of a group in the one or more groups from second list 150, as further explained in FIG. 7. The respective groups of each record can be chosen because the one or more fields that the groups were grouped by were similar. In some embodiments, pair generator 530 may process only a first list 140, and may generate pairs comprising two records from the first list 140. In further embodiments, pair generator 530 may process a first list 140 and second list 150, and may produce pairs that include a single record from each of the lists.

To pair these groups, pair generator 530 can perform a Cartesian product of the two groups. For example, a first group can comprise a first record and a second record while a second group can comprise a third record and a fourth record. The Cartesian product of the first group and the second group would be the entire first record with the entire third record, the entire first record with the entire fourth record, the entire second record with the entire third record, and the entire second record with the entire fourth record. The Cartesian product can also only pair relevant fields of each of the records rather than the entire records. Relevant fields can be determined through the blocking functions or some other determination.

Pairing can be accomplished with a separate data structure that comprises the two records that are paired together. Pairing can also be accomplished by associating the two records that are paired together without moving them to a new data structure.

In some embodiments, the pair generator may be trained, evaluated, validated, and improved via any of the methods described above and below in reference to the blocking models and pair evaluation models. For example, machine learning (including active learning/biased sampling) techniques may be used to improve the pair generator. Similarly, as described above in reference to the blocking models, weightings may be applied when combinations of criteria are used in generating pairs. The weightings may be optimized/trained to improve the accuracy of the pairings generated by the system.

In some embodiments, entity resolution system 120 can be split across one or more networked computers, communicatively coupled via a network (e.g., network 160). In some embodiments, the networked computers can be organized into a distributed computing architecture. For example, the distributed computing architecture can be a system such as Apache Hadoop or Spark. In these embodiments, for example, blocking functions (e.g., the blocking functions provided by first blocker 520 or second blocker 525) can run in parallel across the distributed clusters and can generate output keys for each record for use by pair generator 530. In some embodiments pair generator 530 and the remaining portions of entity resolution system 120 can continue on a single networked computer.

E. Example Feature Evaluation

The paired lists are then processed in a feature evaluator 540. Feature evaluator 540 can evaluate a pair based on one or more of the fields in the records of the pair. The evaluation can be in the form of a numeric score or other evaluation type. The evaluation can be based on a computer generated or user specified function. For example, a pair can be evaluated by the difference in length of its first field. If the first field of the first record in the pair is "Trader Joes" and the first field of the second record in the pair is "Trader Jose," the evaluation by the difference in length of its first field would be 0.

Feature evaluator 540 can also evaluate a pair based on external features. External features include information other than information that is inherently included in either individual record in the pair. External features may include information that may be determined based on a comparison of the two records in the pair, or other analysis of the records in the pair. For example, an external feature may include a distance between the addresses identified in each record of the pair. In this example, two records may have a field that represents an address. An evaluation can send the addresses to a separate process that calculates the distance between the two addresses. An external feature can be added to a number of places, including the records of first list 140, the records of second list 150, a pair, or any combination thereof. The addition of external features can also occur at a number of places, including: before a list is in entity resolution system 120, when a list is in either first cleaner 510 or second cleaner 515, when a list is in first blocker 520 or second block 525, when a group is in pair generator 530, when a record is in feature evaluator 540, or any combination thereof.

Feature evaluator 540 can evaluate a pair one or more times. The one or more evaluation functions may or may not indicate similarity between the records. For example, an evaluation can be the number of words in a particular field. While such an evaluation may not indicate similarity between the records, this type of valuation may still be used in combination with other evaluations to determine similarity between the records.

After one or more evaluation functions are performed by feature evaluator 540, the one or more evaluations are associated with the pair that they are based on. The associations can be through a data structure that holds both records in the pair and the one or more evaluations. The associations can also be metadata or an indicator in the pair that points to the evaluations.

F. Examples of Record Assessment and Pair Evaluation Model Training, Evaluation, and Validation (Including Active Learning)

The pairs with the one or more evaluations can then be passed to a machine learning trainer/evaluator/validator 550, a record assessor 560, or some combination thereof. The trainer/evaluator/validator 550 can create, improve, and validate one or more pair evaluation models that can be applied in record assessor 560 to the pairs with the one or more evaluations. The pair evaluation models can ultimately determine if a particular record is related to another record. A pair evaluation model can also just be passed to record assessor 560, effectively bypassing trainer/evaluator/validator 550. The pair evaluation models can be generated, trained, evaluated, validated, and improved in the trainer/evaluator/validator 550 based on one or more machine learning techniques and based on a portion or all of the pairs with the one or more evaluations. The pair evaluation models can also be based on data not in the pairs, on past data of similar pairs, or on user inputs. The pair evaluation models may also be referred to herein as machine learning models. In some embodiments a pair evaluation model may be a statistical model.

The pair evaluation models may be generated based on machine learning techniques that can be supervised, semi-supervised, or unsupervised machine learning techniques, or some combination thereof. Techniques similar to those described above in reference to the blocking model training, evaluation, and validation may be used here also. For example, the pair evaluation models may be initially trained based on a permissive model, may be improved through automatic and/or manual (e.g., from a user via a user interface, e.g., user interface 524, which may be displayed to a user via client computing device 110) feedback, may be evaluated and validated using various criteria and via user interfaces, and the like.

A supervised machine learning technique can require a user (e.g., via a user interface, e.g., user interface 524) or some other information source to label each pair that the machine learning technique can rely on. Labeling can come in many forms, including a binary indicator of matching or not matching, likelihood that the two records in the pair represent a similar entity, or some other indicator that would aid in determining whether two records are related to a similar entity. Examples of a supervised machine learning technique include decisions trees, bagging, boosting, and random forest. As mentioned above in reference to blocking model validation, review and labeling may be accomplished on a pair-by-pair (or record) basis, or at a higher level. For example, distributions or other evaluation metrics may be reviewed by a user. Advantageously, evaluation by a user usefully may improve the pair evaluation model while simultaneously generating more positive record matches.

A semi-supervised machine learning technique can reduce the number of pairs that a user or some other information source needs to label. An example of a semi-supervised machine learning technique is active learning. Active learning can involve inspecting the pairs and/or their corresponding evaluations to determine which one or more pairs the entity resolution system 120 should inquire about. This inquiry can be provided to a user (e.g., via a user interface such as user interface 524) or some other information source so that one or more of these information sources can provide an input or label to the pair. The input or label can represent whether the user or some other information source deduces that the records of the pair are related to a similar entity. After the entity resolution system 120 receives labels for the one or more pairs, the machine learning technique can show the user or other information source one or more other available pairs for labeling.

After the machine learning technique has received, for example, a matching and non-matching label, the machine learning technique can either show more pairs to the user or other information source or automatically label the remaining pairs. Examples of techniques to automatically label the remaining pairs include linear and logistic regression. A pair is informative to the machine learning technique if it assists the machine learning technique in improving the pair evaluation model's ability to determine whether two records are related to the same entity and can be based on the one or more evaluations that have been made on the pairs by feature evaluator 540.

Efficient training, evaluation, and validation of the pair evaluation models are difficult due the sparse nature of the data. For example, in certain list data sets, positive matches may be sparse, or false positives or false negatives may be sparse also. Thus, random sampling may rarely identify matches that may usefully be evaluated to improve the pair evaluation models.

Accordingly, in some implementations, rather than randomly sampling record match results to validate the pair evaluation models, the active learning approach utilizes biased sampling of results. These biased samples are then automatically or manually (e.g., by a user via user interface 524) evaluated to identify false positives and/or false negatives. This evaluation/validation information is then fed back into the pair evaluation models to improve the models as described above. Biased samples advantageously generate much richer data for evaluation/validation than would otherwise be possible, and enables rapid improvement of the pair evaluation model.

Biased samples may be identified in a number of ways. For example, biased samples may be identified using a heuristic that selects record pairs that differ from one another on a particular key/field different from the keys/fields on which the records were matched. For example, the record pairs may have been matched based on a same physical address, but may differ from one another based on the first name field. Such a pair has a higher likelihood of being a false positive, and thus may be selected, e.g., for manual review.

In some embodiments, using the active learning approach, a matching and non-matching suggestion can be more easily recognized by the machine learning technique in the beginning (e.g., as the pair evaluation model is being trained initially) by taking the highest combined evaluations and the lowest combined evaluations for some field in a record. This is another example of biased sampling, and can increase the likelihood that the records shown to the user are a matching and not matching (e.g., positive or false positives, respectively). In other embodiments, using the biased sampling active learning approach, the machine learning technique may identify indeterminate record pairs, such as a record pair that the pair evaluation model assigns a 50% probability of containing a match. This percentage indicates that the model has little confidence in its assessment as compared to a higher or lower probability. The machine learning technique can thus present indeterminate pairs to the user and adjust the model based on the user's input responses to increase the confidence of the pair evaluation model. In further embodiments, the machine learning technique may identify record pairs where the model has relative confidence in its assessment, and may present these pairs to the user to improve the model. For example, the machine learning technique may identify a record pair that the model assigns a match probability between 70% and 80%, and may present this pair to the user. The machine learning technique can then adjust the model to be more or less confident in its assessment based on the user's input responses. Still further embodiments that utilize other biased sampling strategies to present a number of matching pairs identified by the machine learning technique, receive user input in response, and adjust the pair evaluation model accordingly are understood to be within the scope of the present disclosure.

An unsupervised learning technique allows for no interaction from a user or other information source. Examples of an unsupervised machine learning technique include clustering.

In some embodiments, a trainer/evaluator/validator 550 can take a sample of the pairs from feature evaluator 540. The sample can be chosen by an algorithm (e.g., biased sampling as described above), a user, randomly, or any combination thereof. There is no set size the sample must be. Some samples can be the size of the available memory. Other samples can be set at a specific number, for example 10,000 pairs. Still further, other samples can be set as a number that is determined by a function or process. When using a sample, a machine learning technique or a user (e.g., via a user interface such a user interface 524) can label the pairs in the sample or a portion of the pairs in the sample to create the pair evaluation model.

As described above, active learning techniques may significantly speed up model training (e.g., training pair evaluation models and blocking models) by intelligent biased selection matched records, automatically or manually evaluating those matched records, and training the model with the results. However, biased sampling can result in a biased model if the bias introduced by the sampling is not accounted for in the model training and improvement. Accordingly, in some implementations machine learning technique takes into account the biased probabilities associated with the sampled results when improving/training the models. Specifically, the bias is corrected by taking into account the probability that the false positives and/or false negatives would occur in random sampling without the bias. Bias correction is accomplished by any suitable technique. For example, in training the models, the bias introduced by the active learning sampling may be corrected for by resampling, or by taking mini-batches from the matching results and bias sampling inversely to the probability of the mini-batches being sampled. In the context of model evaluation/validation, the bias introduced by the active learning sampling may be corrected for, for example, by down weighting the objective function for some samples.

The pair evaluation model can output a score that represents the likelihood that the records in each pair are related to a similar entity. The score may be a number between 1 and 0, with 1 representing 100% likelihood that the records in the pair are related to the same entity and 0 representing 0% likelihood that the records in the pair are related to the same entity.

As was previously discussed, record assessor 560 receives the pairs with one or more evaluations from feature evaluator 540 associated with them and the pair evaluation model in order to assess the likelihood that the records in each pair are related to a similar entity. Record assessor 560 applies the pair evaluation model to the one or more evaluations of each pair. Because the sample of pairs has already been trained to the records, the process of scoring new pairs can be accomplished with relative ease using the pair evaluation model.

Because trainer/evaluator/validator 550 can be based on pairs it has already seen, new pairs that are processed in record assessor 560 can update the pair evaluation model to incorporate new records that it sees. Updates to the pair evaluation model allow for increased precision of the system over time.

G. Examples of Filtering

After the assessment in record assessor 560, the pairs with the scores can be filtered in a filter 570. Filtering can distinguish pairs that have a match probability above a certain threshold. Distinguishing the pairs can include indicating in the records that they are associated with other records. Distinguishing can also include gathering the pairs that have a match probability above a certain threshold in a data structure. The threshold can be user specified or automatically generated based on the output of record assessor 560.

After the pairs are distinguished in filter 570, filter 570 can provide a result based on the filtering. The result can be provided in a number of ways, for example, such as showing one or more matching records, a probability that the pair is associated with the same entity, or any combination thereof.

H. Examples of Cluster Generation

The result of filter 570 can also be used to resolve matching entities. Resolving matching entities may comprise combining records that are associated with the same records. Resolving matching entities can also comprise grouping matching records into clusters by passing the results of filter 570 to a cluster generator. In various implementations, the system may include one or more cluster generators that may be executed in parallel or serially, in any combination. FIG. 5 includes two illustrative examples of cluster generators: entity cluster generator 580 and location cluster generator 585. In general, entity cluster generator 580 and location cluster generator 585 each generate clusters of records (or clusters of groups of records, as produced by a blocker, for example), where each cluster includes records that have some relationship with one another. In various other embodiments, clusters may be identified/generated by the cluster generators using any general clustering algorithm, including but not limited to connected components, spectral clustering, maximum likelihood clique detection, modularity, and other algorithms known to those skilled in the art. Specific examples of cluster generators (entity cluster generator 580 and location cluster generator 585) are described below in detail. For example, in some embodiments, as described in more detail below with reference to FIG. 6, entity cluster generator 580 may use filtered pairs (or, in some embodiments, unfiltered pairs) to identify clusters of pairs that have a match probability above a certain threshold and that include pair members in common.

Illustratively, entity cluster generator 580 and location cluster generator 585 may generate different clusters when applied to the same list or lists. In some embodiments, entity cluster generator 580 may process clusters of pairs generated from a single list, as described below, to identify clusters of records within the list that reference a common entity. Further, location cluster generator 585 may process pairs that include one record from a list of transactions and one record from a list of locations. One skilled in the art will appreciate that the process depicted in FIG. 5 may be performed with a first list 140 alone to determine entity names in a list of transaction records, and then performed with the first list 140 and a second list 150 of canonical locations to determine locations for each record. Alternatively, in some embodiments, the entity cluster generator 580 and location cluster generator 585 may generate clusters based on common output from the pair generator 530, with the location cluster generator 585 discarding pairs that do not include exactly one record from a list of locations. One skilled in the art will thus appreciate that the illustrative process depicted in FIG. 5 may be performed iteratively or in parallel as needed, on one or more lists of records, to associate a canonical entity name and location with each record of a set of records.

In some embodiments, clusters of pairs that reference a common entity may be passed to an entity name determiner 590, which may determine a canonical name for the entity based on the fields and other data associated with the record pairs of the cluster. The entity name determiner 590 may, for example, implement the example routine 700 described in more detail with regard to FIG. 7 below.

Clusters of record pairs may also be passed to a location determiner 595, which may determine a canonical location for each transaction. Illustratively, the first list 140 may be a list of transactions, with each transaction containing some indication of location that may not be consistent with other transactions in the list. For example, the first list 140 may include transactions with location indications such as "NYC," "NY City," "New York City," and so forth. The second list 150 may be a list of locations. Illustratively, the second list may be a canonical list of location names associated with the transactions in the first list 140. Each record pair may include one record from each list, and the clusters may each include a particular record from one list. Clusters of pairs may thus illustratively be organized as a graph, which the location determiner 595 may then prune to produce a bipartite graph. Each record of the first list 140 may be paired to one or more records of the second list 150, and each pairing may be assigned a match probability as described above. The location determiner 595 may thus determine a canonical location for each transaction record by pruning the edges of the graph to include only one pairing for each transaction record. For example, the location determiner 595 may receive a cluster of pairs including {transaction #1, San Francisco}, {transaction #1, San Diego}, and {transaction #1, San Antonio}, having match probabilities of 0.7, 0.6, and 0.3 respectively. The location determiner 595 may thus determine San Francisco as a canonical location to associate with transaction #1, and may discard the other two pairings.

In some embodiments, the second list 150 may be generated by comparing location indications in the first list 140 to a canonical list of locations. Illustratively, each location indication in the first list may be paired with one or more locations from the canonical list, and each pairing may be assigned a match probability, as described above. The location determiner 595 may then organize and prune the edges of the resulting graph to determine a subset of locations from the canonical list. The subset of locations may then be paired with transactions from the first list 140 as described above, and provided to the location determiner 595 as the second list 150.

In some embodiments, the cluster generators may be trained, evaluated, validated, and improved via any of the methods described above in reference to the blocking models and pair evaluation models. For example, machine learning (including active learning/biased sampling) techniques may be used to improve the cluster generators. Similarly, as described above in reference to the blocking models, weightings may be applied when combinations of criteria are used in clustering records. The weightings may be optimized/trained to improve the accuracy of the clusters of records.

In some embodiments, the system may enable determining differences (e.g., a "diff") between two sets of clusters. Thus, for example, if a user or the system changes any of the strategies described herein (e.g., blocking, pair generation, filtering, etc.) such that the clusters that are generated is changes, the system may enable a user to identify (e.g., via a user interface) the differences between the sets of clusters. Identification of such differences may be useful, for example, for debugging or improving the cluster generation or other aspects of the system as described herein.

Example Methods of Clustering Common Entities

Figure 6:
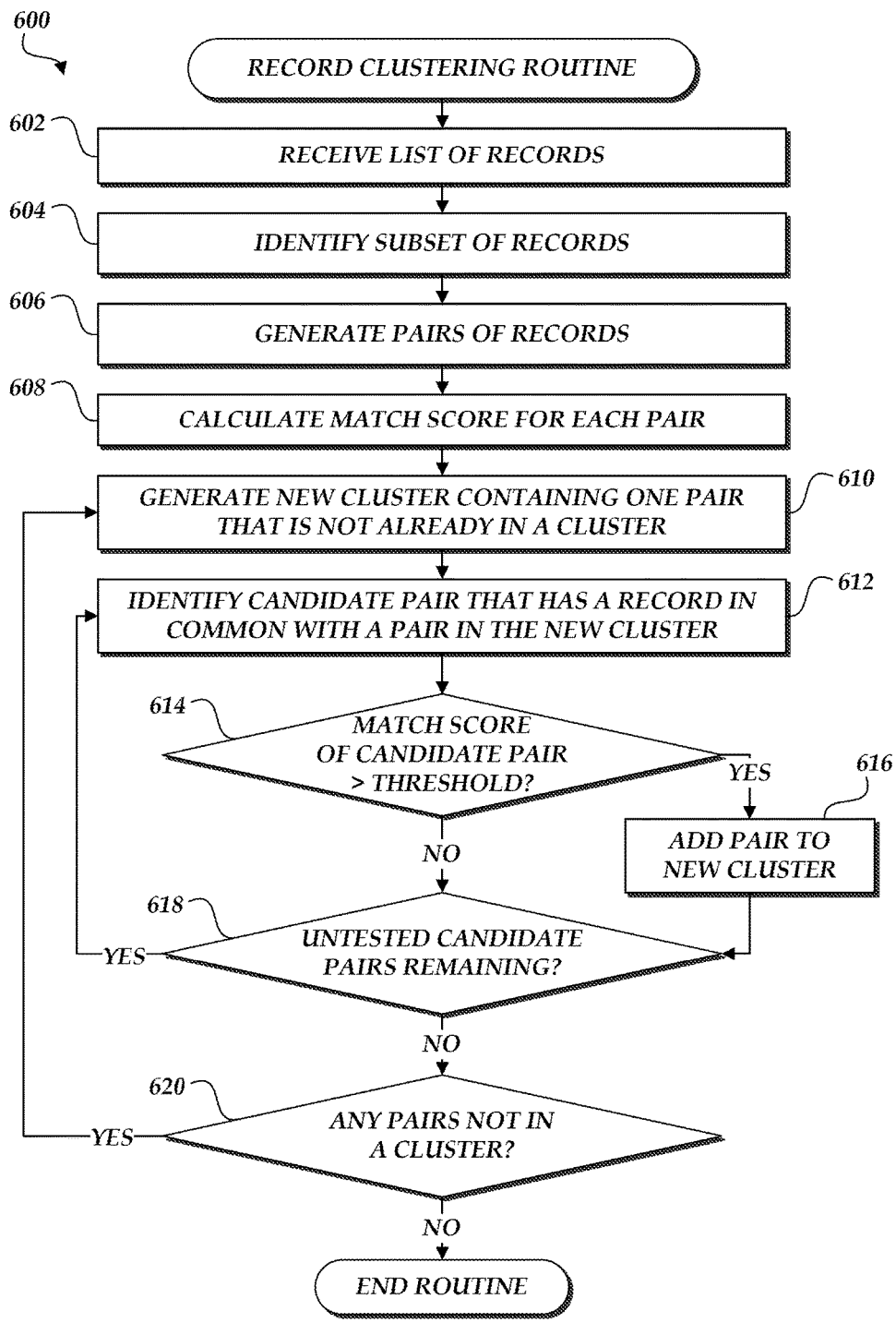
FIG. 6 is a flowchart representing an example method for clustering records associated to common entities across multiple lists, consistent with embodiments of the present disclosure.

FIG. 6 is a flowchart representing an example routine 600 for clustering related records that refer to common entities, consistent with embodiments of the present disclosure. While the flowchart discloses the following steps in a particular order, it will be appreciated that at least some of the steps can be moved, modified, or deleted where appropriate, consistent with the teachings of the present disclosure. The clustering can be performed in full or in part by an entity resolution system (e.g., entity resolution system 120), illustratively by carrying out a process such as the process illustrated in FIG. 5. It is appreciated that some of these steps can be performed in full or in part by other components (e.g., such as client computing device 110 identified above in FIG. 1).

At block 602, one or more lists of records may be received. The received list of records may illustratively be first list 140, second list 150, or in some embodiments both lists. The received list or lists may each comprise a plurality of records, with each record comprising one or more fields.

At block 604, a subset of records may be identified from the list or lists received at block 602. The subset of records may be identified based on one or more fields of each record. For example, the received lists of records may each contain a postal code field, and a subset of records may be identified that have a common value in the postal code field. As a further example, a first list and a second list may be received, both of which have a telephone number field. A subset of records may be identified including the records of the first list and second lists having a common telephone number prefix. In some embodiments, multiple fields may be used to identify subsets, and may identify based on string matching, pattern matching, numerical values, calculations, or other criteria. One skilled in the art will appreciate that the field or fields used to identify a subset of records may differ from the fields used to identify a cluster of records that reference a common entity.

At block 606, pairs of records may be generated. Illustratively, an individual record in the subset of records may be paired with each of the other records in the subset, or may be paired only with certain records based on one or more fields of the record. For example, a record may only be paired with other records that share a postal code, an address, or a telephone number prefix. In some embodiments, the pairing may be based on a Cartesian product, as described above. A particular record may thus be paired multiple times with any number of other records from the list or lists. In some embodiments, pairs may be generated only by combining a record from a first list with a record from a second list, such that there are no pairs with two records from the same list. In other embodiments, a single list may be received in block 602 and the pairs may all be of records from the same list.

Thereafter, at block 608, a match score may be calculated for each generated pair. Match scores may be calculated, for example, using one of the pair evaluation models described above. The match score may illustratively indicate a probability that the records of the pair both refer to the same entity. For example, the first record of a pair may contain a street address field with the value "401 W. 14$^{th}$ St." and the second record of the pair may contain a street address field with the value "Corner 9$^{th}$ Ave. & 14$^{th}$ St." A match score may be determined indicating, for example, an 85% probability that both records refer to the same physical location. As a further example, pairs may be generated at block 606 by pairing records from a canonical list of cities with transaction records representing a credit card transaction that may have taken place in that city. Pairs may thus be generated including {Kansas City, transaction #1}, {Seattle, transaction #1}, {Seattle, transaction #2}, and so forth. A match score may be determined for each pair indicating a 70% match probability for {Kansas City, transaction #1}, a 40% match probability for {Seattle, transaction #1}, and an 85% match probability for {Seattle, transaction #2}.

Match scores may be determined based on a field or fields corresponding to the entity. For example, the entity may be a geographic location, a particular merchant or store, or a street address, and the records may contain one or more fields corresponding to the entity. Match scores may further be determined based on a field or fields that do not directly correspond to the entity. For example, the records may each contain a field indicating a transaction amount, and a match score for the geographic location may be determined based on the similarity of the transaction amounts.

At block 610, a new cluster may be generated. Illustratively, the new cluster may be generated by identifying a first pair of records that is not in a cluster and generating a cluster that contains the first pair of records. One skilled in the art will further understand that, when block 610 is first carried out, no pairs of records are in clusters and any pair may be arbitrarily chosen as the first pair. In various embodiments, the first pair may have a match score above a threshold (which is not necessarily the same threshold used in block 614), may have the highest match score of any pair not already in a cluster, or may be chosen according to other criteria.

Thereafter, at block 612, a second pair of records may be identified as a candidate for inclusion in the cluster. The second pair may illustratively be identified as a pair that shares a record with the first pair. For example, a first pair contains records {A, B}. The second pair identified at block 612 could thus be {A, C}, {A, D}, {B, C}, or generally any other pair that includes either record A or record B. In some embodiments, only pairs having a shared record from a particular list may be identified as candidates for inclusion in the cluster. For example, pairs may be generated at block 606 by pairing a record from a canonical list of cities with a transaction record representing a transaction that may have taken place in that city. An example of such a pair may be {Kansas City, transaction 1}, which may be placed into a new cluster in block 610. The routine 600 may thus identify {Kansas City, transaction 2} as a potential candidate for inclusion in the cluster of records. However, the routine 600 may exclude the pair {Seattle, transaction 1} from consideration as a candidate for the cluster, even though the latter pair has a record in common with the first pair.

At decision block 614, the candidate pair may be evaluated to determine whether its match score exceeds a threshold. The threshold may illustratively be chosen based on user input, calculated match scores, previous executions of the record clustering routine 600, or other criteria. For example, a cluster of transaction records may be initially seeded with the pair {Joe's BBQ, Joe's Barbeque}, and candidate pair {Joe's BBQ, A-1 Auto Repair} may be evaluated for inclusion in the cluster. The candidate pair may have a match score of 0.3, indicating a 30% probability that both records refer to the same merchant. The match score of the candidate pair may be compared to, for example, a 60% threshold to determine whether it should be included in the cluster.

If the candidate pair has a match score exceeding the threshold, then the routine 600 branches to block 616 and the candidate pair is added to the cluster. If not, then the routine 600 proceeds to decision block 618, where a determination is made as to whether there are any untested candidate pairs remaining. If a candidate pair meeting the criteria of block 612 can be identified, then the routine 600 branches to block 612 and iterates through the remaining candidate pairs.

If there are no remaining candidate pairs, then the routine 600 branches to decision block 620, where a determination is made as to whether there are any remaining pairs that are not in a cluster. If any such pairs exist, the routine branches to block 610 and generates a new cluster containing one of the pairs. If no such pairs exist, the routine ends.

One skilled in the art will appreciate that the record clustering routine 600 may produce clusters containing a single pair, if no other pairs both share a record with that pair and have a match score above the threshold in block 614. One skilled in the art will further appreciate that the blocks of routine 600 are illustrative and may be combined or carried out in different orders. For example, in some embodiments, the calculation of match scores at block 608 may be deferred until the first time a pair is tested against the threshold at block 614. In further embodiments, block 604 may be omitted or deferred. For example, pairs may be generated for all combinations of records, and a subset may be identified based on the calculated match scores. The routine depicted in FIG. 6 is thus understood to be illustrative and not limiting, and the present disclosure is understood to include other clustering algorithms beyond the specific example depicted. Illustratively, any graph clustering or community detection algorithm may be used to identify clusters without departing from the scope of the present disclosure.

Example Methods of Clustering to Determine Canonical Entity Names

Figure 7:
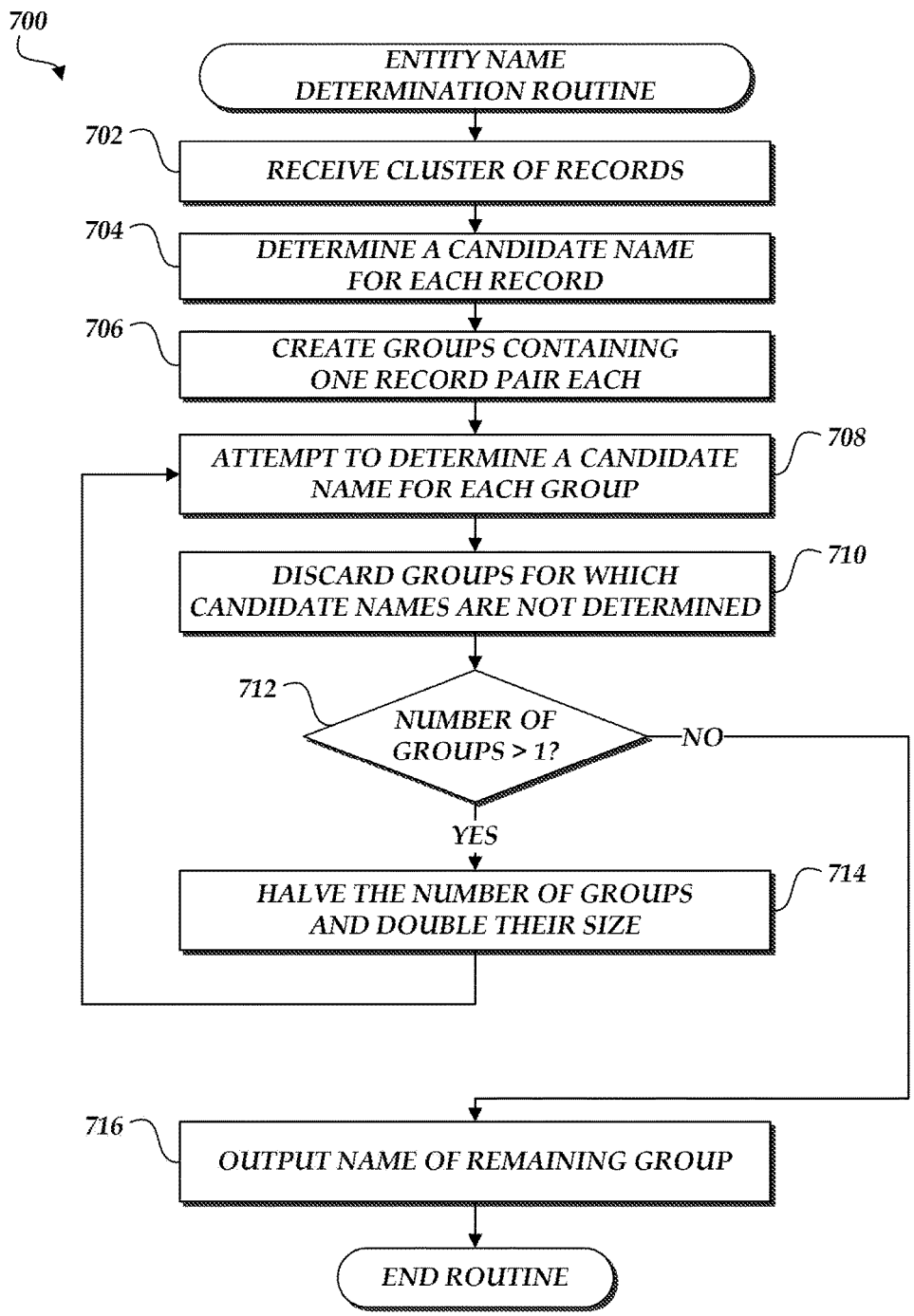
FIG. 7 is a flowchart representing an example method for determining canonical entity names for entities associated to clusters of records, consistent with embodiments of the present disclosure.

FIG. 7 is a flowchart representing an example method 700 for determining a canonical entity name from a diverse group of records referring to the entity, consistent with embodiments of the present disclosure. While the flowchart discloses the following steps in a particular order, it will be appreciated that at least some of the steps can be moved, modified, or deleted where appropriate, consistent with the teachings of the present disclosure. The pairing can be performed in full or in part by an entity resolution system (e.g., entity resolution system 120). It is appreciated that some of these steps can be performed in full or in part by other components (e.g., such as client computing device 110 identified above in FIG. 1).

At block 702, a cluster of records may be received that each refer to a common entity. Illustratively, the cluster may be generated by a record clustering routine, such as the illustrative routine 600 of FIG. 6. Thereafter, at block 704, each record within the cluster may be analyzed to determine a candidate name for the entity. Illustratively, a cluster of twenty records may be analyzed at block 704 to produce twenty candidate names for the entity.

At block 706, the records may be arbitrarily put into groups, which may initially contain one record pair each. At block 708, the groups may be analyzed to determine a candidate name for the group and a confidence level in the determined candidate name. A candidate entity name may illustratively be determined by analyzing one or more fields of the records in the record pair. For example, a first record of a record pair may contain the merchant name "Joe's Bar—franchise #373," and a second record of the record pair may contain the merchant name "Joe's Bar and Grill." The merchant names may be analyzed to identify a longest common substring, such as "Joe's Bar," as a candidate entity name based on the fields of the first pair. As a further example, the candidate name or a confidence level in the candidate name may be determined based on calculating a Levenshtein distance between the fields of the pair.

At block 710, groups for which a viable candidate name could not be determined may be discarded. For example, a pair of records having the candidate names "Joe's Bar" and "Jack's BBQ" may be grouped together. These records may be analyzed as described above to produce the candidate name "J," which may be discarded as unviable. Candidate names may be considered unviable if, for example, the length of the name falls below a threshold, or if the candidate name fails to meet other specified criteria.

At decision block 712, a determination is made as to whether the number of groups is more than one. If not, then the routine 700 branches to block 716, where the candidate name of a remaining group may be output as the determined entity name, and then the routine ends.

If more than one group remains, then the routine 700 branches to block 714, where the number of groups may be reduced. For example, the groups comprising one record pair may be combined to create groups containing a "pair of pairs" or a quartet of records. The routine then returns to block 708, where a candidate name for the new group may be determined. For example, the pair above with the candidate name "Joe's Bar" may be compared to a pair for which the determined candidate name was "Joe's Bar—franchise "#," and these candidate names may be compared as described above to produce a new candidate name "Joe's Bar."

The routine 700 then iterates through blocks 708-714 repeatedly, producing smaller numbers of larger groups (comprising quartets of pairs, octets of pairs, etc.) until a single group and one canonical name remains. In some embodiments, arbitrary numbers of groups and/or groups of varying sizes may be combined into a single group. For example, a group representing a candidate name based on analysis of eight records may be combined with a group based on four records, and the determination of a candidate name for the combined group may be weighted in favor of the larger group. In further embodiments, confidence levels in the determinations may be used as weighting factors when combining groups.

One skilled in the art will appreciate that the blocks of routine 700 may be varied, combined, or reordered within the scope of the present disclosure. For example, block 710 may select which groups to combine based on the current candidate strings. As a further example, block 714 may discard the group with the shortest candidate name rather than applying an arbitrary length threshold, or may apply other criteria to determine which groups are discarded.

Example Methods of Presentation of Records

Figure 8:
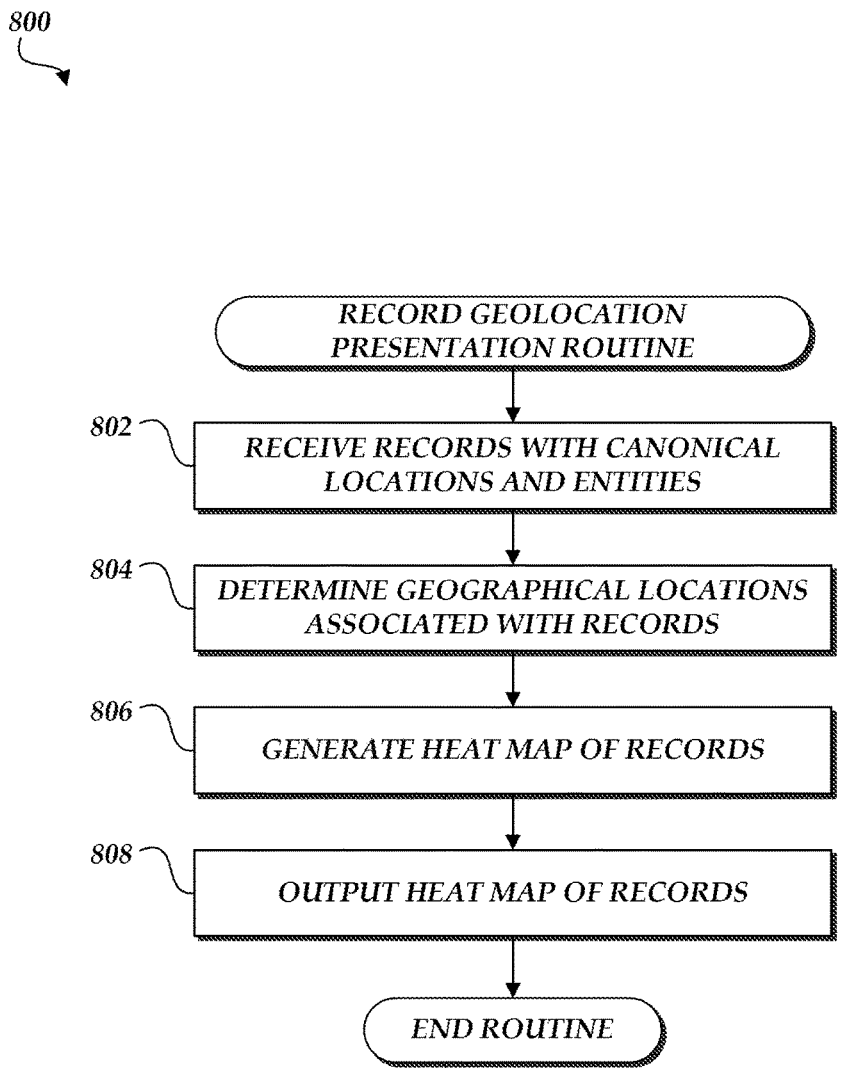
FIG. 8 is a flowchart representing an example method for presenting records associated with canonical location entities, consistent with embodiments of the present disclosure.

FIG. 8 is a flowchart representing an example routine 800 for presentation of records associated with a canonical location entity, consistent with embodiments of the present disclosure. While the flowchart discloses the following steps in a particular order, it will be appreciated that at least some of the steps can be moved, modified, or deleted where appropriate, consistent with the teachings of the present disclosure. The routine 800 can be performed in full or in part by an entity resolution system (e.g., entity resolution system 120). It is appreciated that some of these steps can be performed in full or in part by other components (e.g., such as client computing device 110 identified above in FIG. 1).

At block 802, records may be received that relate to location entities. Illustratively, records may be associated to location entities by the process depicted in FIG. 5, using a list of records and a canonical list of locations as the first list and the second list, and using clustering algorithms that determine the most probable location entity for each record, as described above. In some embodiments, the records may be transaction records that are further associated with a common entity (e.g., a merchant).

At block 804, a geographical location may be determined for each record. In some embodiments, a canonical list of location records may include geographic information (e.g., street addresses or latitude-longitude coordinates) for each location, which may be used along with the location clustering described above to facilitate geolocation. In other embodiments, a geographical location may be determined by identifying a cluster of records associated with a particular merchant entity and identifying a geographical location associated with the merchant. In further embodiments, a canonical location may be determined by carrying out the example routine 700 against a particular field or fields, such as an address field in a transaction record. One skilled in the art will appreciate that the examples of the present disclosure are illustrative rather than limiting.

At block 806, a heat map or other representation of record locations may be generated, illustratively based on information contained in the records or on other data. A heat map may, for example, overlay transaction data on a geographic map, presenting transactions or transaction volumes as various colors, symbols, shadings, or other representations. At block 808, the heat map or other representation may be output, illustratively to the client computing device 110 of FIG. 1.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA)

instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
  a data store configured to store computer-executable instructions and a plurality of records, wherein each record of the plurality of records is associated with a respective entity and comprises one or more fields;
  a computing device including a processor in communication with the data store, the processor configured to execute the computer-executable instructions to at least:
    identify, based at least in part on a first field of the one or more fields, a first group of the plurality of records;
    determine that a distribution of sizes of groups including the first group satisfies a distribution rule;
    generate one or more record pairs from the first group, each of the one or more record pairs comprising a respective first record and second record, wherein at least one field of the first record differs from a corresponding field in the second record;
    determine, for each of the one or more record pairs, a respective match score, the respective match scores comprising probabilities that the respective first record and second record of the respective record pair are associated with a respective same entity;
    identify a plurality of clusters of record pairs, wherein each pair in each cluster has a record in common with at least one other pair in the cluster, and wherein each pair in each cluster has a respective match score above a threshold;

determine, for each of the plurality of clusters, that a diameter of the cluster satisfies a diameter criterion;

determine, for each of the plurality of clusters, that an entropy of the cluster satisfies an entropy criterion;

determine, based at least in part on the distribution of sizes of groups, the respective match scores, the diameter criterion, and the entropy criterion, that each of the plurality of clusters corresponds to a respective entity;

determine, for each of the plurality of clusters, a geographical location associated with the cluster, the geographic location corresponding to the respective entity;

generate, based at least in part on the geographical location associated with each cluster and a number of record pairs in each cluster, a heat map for display on a client computing device, wherein the heat map enables identification of suitable locations for providing coverage of the geographical locations associated with the clusters, wherein the heat map overlays information regarding the number of record pairs in each cluster on the geographic location associated with the cluster, and wherein the heat map displays information regarding the at least one field of individual records in each cluster as a color, symbol, shading, or other representation; and cause the client computing device to display the heat map.

2. The system of claim 1, wherein the processor is further configured to execute the computer-executable instructions to at least:

determine, based at least in part on a first pair in a first cluster of the plurality of clusters of record pairs, a first candidate name to associate with the cluster;

determine, based at least in part on a second pair in the first cluster, a second candidate name based to associate with the cluster; and determine a name to associate with the first cluster based at least in part on the first candidate name and the second candidate name.

3. The system of claim 2, wherein determining the first candidate name is based at least in part on a first field of the first record and a corresponding second field of the second record.

4. The system of claim 3, wherein determining the first candidate name comprises identifying a longest common substring of the first field and the second field.

5. The system of claim 3, wherein determining the first candidate name is based at least in part on calculating a Levenshtein distance between a first field of the first record and a corresponding second field of the second record.

6. The system of claim 1, wherein the processor is further configured to execute the computer-executable instructions to identify the first group of the plurality of records by at least:

accessing a first record, a second record, and a third record of the plurality of records;

accessing a blocking model including information indicative of at least a first field and a second field to be compared between candidate pairs of records;

comparing a value of the first field of the first record with a value of the first field of the second record to determine first matching fields;

comparing a value of the second field of the first record with a value of the second field of the second record to determine second matching fields;

in response to determining the first matching fields and the second matching fields, grouping the first record and the second record into the first group;

comparing the value of the first field of the second record with a value of the first field of the third record to determine third matching fields;

comparing the value of the second field of the second record with a value of the second field of the third record to determine fourth matching fields; and in response to determining the third matching fields and the fourth matching fields, adding the third record to the first group.

7. The system of claim 6, wherein determining at least one of the first, second, third, or fourth matching fields is based at least in part on a soft or fuzzy match.

8. The system of claim 6, wherein determining at least one of the first, second, third, or fourth matching fields is based at least in part on a weighting.

9. The system of claim 1, wherein the processor is further configured to execute the computer-executable instructions to identify the first group of the plurality of records by at least:

accessing a first record, a second record, and a third record of the plurality of records;

accessing a blocking model including information indicative of at least a first field to be compared between candidate pairs of records and a second field to be compared between candidate pairs of records;

comparing a value of the first field of the first record with a value of the first field of the second record to determine first matching fields;

in response to determining the first matching fields, grouping the first record and the second record into the first group;

comparing a value of the first field of the second record with a value of the first field of the third record to determine that the fields do not match;

comparing the value of the second field of the second record with a value of the second field of the third record to determine second matching fields;

in response to determining the second matching fields, adding the third record to the first group.

10. The system of claim 1, wherein the processor is further configured to execute the computer-executable instructions to at least:

validate the first group of the plurality of records by at least one of:
  determining that a size of the first group satisfies a threshold, or
  determining that a distribution of sizes of groups including the first group satisfies a distribution rule.

11. A method comprising:

obtaining a first plurality of records, wherein each record of the first plurality of records is associated with a respective entity and comprises a first one or more fields;

obtaining a second plurality of records, wherein each record of the second plurality of records is associated with a respective entity and comprises a second one or more fields, and wherein each record of the second plurality of records is associated with a different entity;

identifying, based at least in part on a first field of the first one or more fields, a first subset of the first plurality of records;

determining that a distribution of sizes of subsets of the first plurality of records satisfies a distribution rule, the subsets of the first plurality of records including the first subset;

identifying, based at least in part on a second field of the second one or more fields, a second subset of the second plurality of records;

generating a plurality of record pairs, wherein each record pair in the plurality of record pairs comprises a respective first record from the first subset and a respective second record from the second subset, and wherein at least one field of the first record differs from a corresponding field in the second record;

determining a respective match score for each of the plurality of record pairs, the respective match scores comprising probabilities that the respective first record and second record of the respective record pairs are associated with a respective same entity;

identifying, for each record in the first subset, a respective cluster of record pairs, wherein each record pair in the cluster includes the record;

determining, for each cluster of record pairs, that a diameter of the cluster satisfies a diameter criterion;

determining, for each cluster of record pairs, that an entropy of the cluster satisfies an entropy criterion;

determining, based at least in part on the distribution of sizes, the respective match scores, the diameter criterion, and the entropy criterion, that each cluster of record pairs corresponds to a respective entity;

identifying, for each cluster of record pairs, a respective matching record pair based at least in part on the match scores of the record pairs in the cluster;

generating, based at least in part on a geographical location associated with each cluster and a number of record pairs in each cluster, a heat map for display on a client computing device, wherein the heat map enables identification of suitable locations for providing coverage of the geographical location associated with the clusters, wherein the heat map overlays information regarding the number of record pairs in each cluster on the geographic location associated with the cluster, and wherein the heat map displays information regarding the at least one field of individual records in each cluster as a color, symbol, shading, or other representation; and causing the client computing device to display the heat map.

12. The method of claim 11, wherein identifying the respective matching record pair for each cluster comprises identifying a record pair having a highest match score.

13. The method of claim 11, wherein determining a match score is based at least in part on one or more reference pairs.

14. The method of claim 13, wherein the one or more reference pairs each comprise a first matched record associated with a first entity and a second matched record associated with the first entity.

15. The method of claim 13, wherein the one or more reference pairs each comprise a first unmatched record associated with a first entity and a second unmatched record associated with a second entity.

16. The method of claim 11 further comprising:
identifying an indeterminate record pair of the plurality of record pairs, the indeterminate record pair having a match score indicating a least certainty of whether the first record and second record of the indeterminate record pair are associated with the same entity;
outputting the indeterminate record pair to a user;
receiving, from the user, an indication that the first record and the second record of the indeterminate record pair are associated with the same entity;
calculating, for each of the plurality of record pairs, a respective revised match score based at least in part on the indication;
wherein identifying the respective matching record pair for each cluster of record pairs is further based at least in part on the revised match scores of the record pairs in the cluster.

17. A non-transitory computer-readable storage medium including computer-executable instructions that, when executed by a processor, cause the processor to:
obtain a plurality of records, wherein each record of the plurality of records is associated with a respective entity and comprises one or more fields;
generate one or more record pairs from at least a portion of the plurality of records, each of the one or more record pairs comprising a respective first record and second record, wherein at least one field of the first record differs from a corresponding field in the second record, and wherein a distribution of portions of the plurality of records satisfies a distribution rule;
determine, for each of the one or more record pairs, a respective match score, the respective match scores comprising probabilities that the respective first record and second record of the respective record pairs are associated with a respective same entity;
identify a first cluster of record pairs, wherein each pair in the first cluster has a record in common with at least one other pair in the first cluster, and wherein each pair in the first cluster has a respective match score above a first threshold;
determine that an entropy of the first cluster of record pairs satisfies an entropy criterion;
generate, based at least in part on a geographical location associated with the first cluster and a number of record pairs in the first cluster, a heat map for display on a client computing device, wherein the heat map enables identification of suitable locations for providing coverage of the geographical location associated with the first cluster, wherein the heat map overlays information regarding the number of record pairs in the first cluster on the geographic location associated with the first cluster, and wherein the heat map displays information regarding the at least one field of individual records in the first cluster as a color, symbol, shading, or other representation; and
causing the client computing device to display the heat map.

18. The non-transitory computer-readable storage medium of claim 17, wherein the computer-executable instructions that cause the processor to determine a respective match score for each of the one or more record pairs comprise computer-executable instructions that cause the processor to:
obtain a plurality of reference pairs, each of the plurality of reference pairs comprising a respective first record and second record, wherein the respective first record and second record of a reference pair are associated with the same entity;
determine a first plurality of match scores according to a first model, wherein the first plurality of match scores corresponds to the plurality of reference pairs;
determine a second plurality of match scores according to a second model, wherein the second plurality of match scores corresponds to the plurality of reference pairs;

determine, based at least in part on the first plurality of match scores, a first accuracy score for the first model;

determine, based at least in part on the second plurality of match scores, a second accuracy score for the second model;

wherein the computer-executable instructions that cause the processor to determine the respective match score for each of the one or more record pairs cause the processor to determine the respective match score according to the model having the higher accuracy score.

19. The non-transitory computer-readable storage medium of claim 17, wherein the computer-executable instructions further cause the processor to:

output the first cluster of record pairs to a client computing device;

receive, from the client computing device, a second threshold;

identify a second cluster of record pairs, wherein each pair of the second cluster has a record in common with at least one other pair in the second cluster, and wherein each pair in the second cluster has a respective match score above the second threshold; and output the second cluster to the client computing device.

20. The non-transitory computer-readable storage medium of claim 17, wherein the computer-executable instructions further cause the processor to generate one or more normalized fields for the plurality of records, and wherein the respective match score for each of the one or more record pairs is based at least in part on the one or more normalized fields.

* * * * *